US006208367B1

(12) United States Patent
Tanimoto et al.

(10) Patent No.: US 6,208,367 B1
(45) Date of Patent: Mar. 27, 2001

(54) LIGHT BEAM SCANNING APPARATUS AND IMAGE FORMING APPARATUS

(75) Inventors: Koji Tanimoto; Kenichi Komiya, both of Kawasaki; Naoaki Ide, Shizuoka; Jun Sakakibara, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/231,878

(22) Filed: Jan. 14, 1999

(30) Foreign Application Priority Data

Jan. 16, 1998 (JP) .................................................. 10-006776

(51) Int. Cl.[7] ...................................................... B41J 2/47
(52) U.S. Cl. ............................................. 347/235; 347/250
(58) Field of Search ...................................... 347/235, 241, 347/242, 250, 253, 230, 249; 250/204, 205; 358/475

(56) References Cited

U.S. PATENT DOCUMENTS

| 4,695,849 | 9/1987 | Dei ........................................ 347/250 |
| 4,965,590 | 10/1990 | Yamazaki ............................. 347/249 |
| 5,568,071 | * 10/1996 | Hoshino et al. ....................... 377/43 |
| 5,576,852 | 11/1996 | Sawada et al. ....................... 358/475 |
| 6,014,161 | * 1/2000 | Hirst et al. ............................ 347/252 |

FOREIGN PATENT DOCUMENTS

| 0 505 741 A1 | 9/1992 | (EP) . |
| 0812101A2 | * 10/1997 | (EP) .................................... 347/253 |
| 0 812 101 A2 | 12/1997 | (EP) . |
| 3-57452 | 9/1991 | (JP) . |

* cited by examiner

Primary Examiner—N. Le
Assistant Examiner—Lamson D. Nguyen
(74) Attorney, Agent, or Firm—Foley & Lardner

(57) ABSTRACT

Four beams are caused to scan a scanning surface in the main scanning direction in parallel. The beams expose the target area between two optical sensors, not the surface of a photosensitive drum, to produce correction data to correct shifts in the exposure positions of the four beams in the main scanning direction with an accuracy of less than a small fraction of one pixel. On the basis of the correction data, an actual image formation area is set on the photosensitive drum. This makes it possible to always control the relative exposure scanning position accurately even when the relationship between the main scanning positions of the light beams is unknown.

9 Claims, 22 Drawing Sheets

LIGHT BEAM SCANNING APPARATUS AND IMAGE FORMING APPARATUS

BACKGROUND OF THE INVENTION

This invention relates to a light beam scanning apparatus for causing, for example, laser beams to scan the surface of a photosensitive drum simultaneously to form an electrostatic latent image on the photosensitive drum and to an image forming apparatus, such as a digital copying machine or a laser printer, using the light beam scanning apparatus.

In recent years, various digital copying machines have been developed which form images by, for example, laserbeam scanning exposure and electronic photograph processing.

To step up the image forming speed, the multi-beam digital copying machines have recently been developed. In this type of digital copying machine, more than one laser beam is generated and they are caused to scan in units of lines simultaneously.

The multi-beam digital copying machine comprises semiconductor laser oscillators for generating laser beams, a polyhedral rotating mirror, such as a polygon mirror, and an optical system unit acting as a light-beam scanning apparatus. The polyhedral rotating mirror reflects the laser beams emitted from the laser oscillators toward a photosensitive drum to cause each laser beam to scan the surface of the photosensitive drum. The optical system unit is composed mainly of a collimator lens and an f-θ lens.

A method of controlling the exposure position accurately in the direction in which a laser beam scans (or the main scanning direction) in a digital copying machine of the multi-beam type has been disclosed in, for example, Jpn. Pat. Appln. KOKOKU Publication No. 1-43294, Jpn. Pat. Appln. KOKOKU Publication No. 3-57452, Jpn. Pat. Appln. KOKOKU Publication No. 3-57453, Jpn. UM Appln. KOKOKU Publication No. 5-32824, or Jpn. Pat. Appln. KOKAI Publication No. 56-104572.

Jpn. Pat. Appln. KOKOKU Publication No. 1-43294 has disclosed a method of using a light beam sensor to sense the timing with which light beams arrive. In this method, the order in which the light beams arrive is unknown. Therefore, the method is not suitable for an optical system where two or more light beam arrive simultaneously.

Jpn. Pat. Appln. KOKOKU Publication No. 3-57452 has disclosed a method of providing separate light-receiving sections for sensing light beams independently and permitting each light beam to expose the corresponding light-receiving section and pass through it. On the basis of the signal from each light-receiving section, the light-emitting timing for printing by each light beam (or recording or image formation) is produced.

However, for example, when plural recording dot pitches (resolutions), such as 300 dpi, 400 dpi, and 600 dpi, or 16 lines/mm and 15.4 lines/mm, are needed, the number of revolutions of the polygon mirror or the frequency of image clock must be changed. In this case, it is difficult to align the print start position of each light beam because of the following problems: the phase of the output signal from each light-receiving section may change with respect to the corresponding light beam, the timing with which each light beam arrives at the print start position, and the difference in arriving timing between the light beams cannot be divided by one period of image clock.

The method disclosed in Jpn. Pat. Appln. KOKOKU Publication No. 3-57453 has been based on the assumption that the main scanning image formation area for each light beam is designed to shift in the main scanning direction. Therefore, the method is not suitable for such an optical system as is shown in embodiments of the present invention.

The method disclosed in UM Appln. KOKOKU Publication No. 5-32824 is not suitable for such an optical system as is shown in embodiments of the present invention because of the same reason as in the method in Jpn. Pat. Appln. KOKOKU Publication No. 3-57452.

The method disclosed in Jpn. Pat. Appln. KOKAI Publication No. 56-104572 is to produce a synchronizing signal using one of plural light beams and control the light-emitting timing for each light beam on the basis of the synchronizing signal. The relationship between the scanning positions of the light beams must be known beforehand. Therefore, the method is not suitable for such an optical system as is shown in embodiments of the present invention.

BRIEF SUMMARY OF THE INVENTION

It is an object of the present invention to provide a light beam scanning apparatus and an image forming apparatus which are applicable to an optical system where the order in which light beams are caused to scan in the main scanning direction is unknown (they may be caused to scan simultaneously) and which are capable of constantly controlling the exposure position in the main scanning direction with an accuracy of a small fraction of a pixel.

Another object of the present invention is to provide a light beam scanning apparatus and an image forming apparatus which are applicable to more than one resolution.

In order to achieve the above objects, according to one aspect of the present invention, there is provided a light beam scanning apparatus comprising: a plurality of beam generating means for generating light beams; scanning means for optically combining the light beams generated at the beam generating means, reflecting the combined beams to a scanning surface including the surface of an image retaining element, and causing the light beams to scan the scanning surface; first sensing means, provided near the image retaining element for sensing the first one of the light beams caused by the scanning means to scan; clock generating means for generating a pixel clock to be used in the beam generating means for each of the light beams, in response to a sense signal indicating that the first beam has exposed the first sensing means; second sensing means, provided on the more downstream side in the main scanning direction than the first sensing means and, for sensing the light beams; first control means for giving control data to the clock generating means so that the light beams may expose a target area between the first and second sensing means; and image formation area setting means for determining a pixel clock area corresponding to a target image formation area on the image retaining element on the basis of the control data from the control means and setting the pixel clock area in the clock generating means.

Accordingly, four beams, which are parallel with each other in the sub-scanning direction, are caused to scan a scanning surface in the main scanning direction. The beams expose the target area between two optical sensing means, not the surface of the image retaining element, to produce correction data to correct shifts in the exposure positions of the four beams in the main scanning direction with an accuracy of less than a small fraction of one pixel. On the basis of the correction data, an image formation area is set on the image retaining element.

The clock generating means includes: clock means for generating a clock signal a specific time after the first beam exposed the first sensing means; delay means which delays the clock signal generated at the clock means, selects the delay of the clock in a range of one clock or less for each beam, and provides a delayed clock signal as a pixel clock to be used to generate a beam; and clock setting means for setting, for the respective beams, exposure pixel clock areas used by the beam generating means in the pixel clocks given by the delay means and providing exposure pixel clocks.

The delay means includes a delay line and delay clock selectors, the delay line having taps, and each of the delay clock selectors designed to select and output a delayed clock generated at one tap, which is to be used to generate one beam.

Specifically, to align the image formation positions of the four beams accurately in the main scanning direction, the amount of delay is given to the clock signal with an accuracy of one-tenth of a clock for each of the beam generating means independently.

The target area between the first and second sensing means is an area overlapping with the second sensing means, the light beam scanning apparatus further comprising: a counter for counting the number of times the beams expose the second sensing means; second control means for driving one of the beam generating means using the exposure pixel clock obtained from the clock setting means controlled on the basis of the control data and causing the scanning means to scan the scanning surface a specific number of times; comparison means for reading a value in the counter after the second control means has scanned the specific number of times and comparing the value with a predetermined number; means for selecting the next tap whose amount of delay is greater than that of the selected tap when the result of the comparison at the comparison means has shown that the value in the counter is smaller than the predetermined number; and amount-of-delay setting means, when the result of the comparison at the comparison means has shown that the value in the counter is equal to the predetermined number, for setting a delay selected at that time as the amount of delay for the one of the beam generating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, an embodiment of the present invention will be explained.

Figure 1:
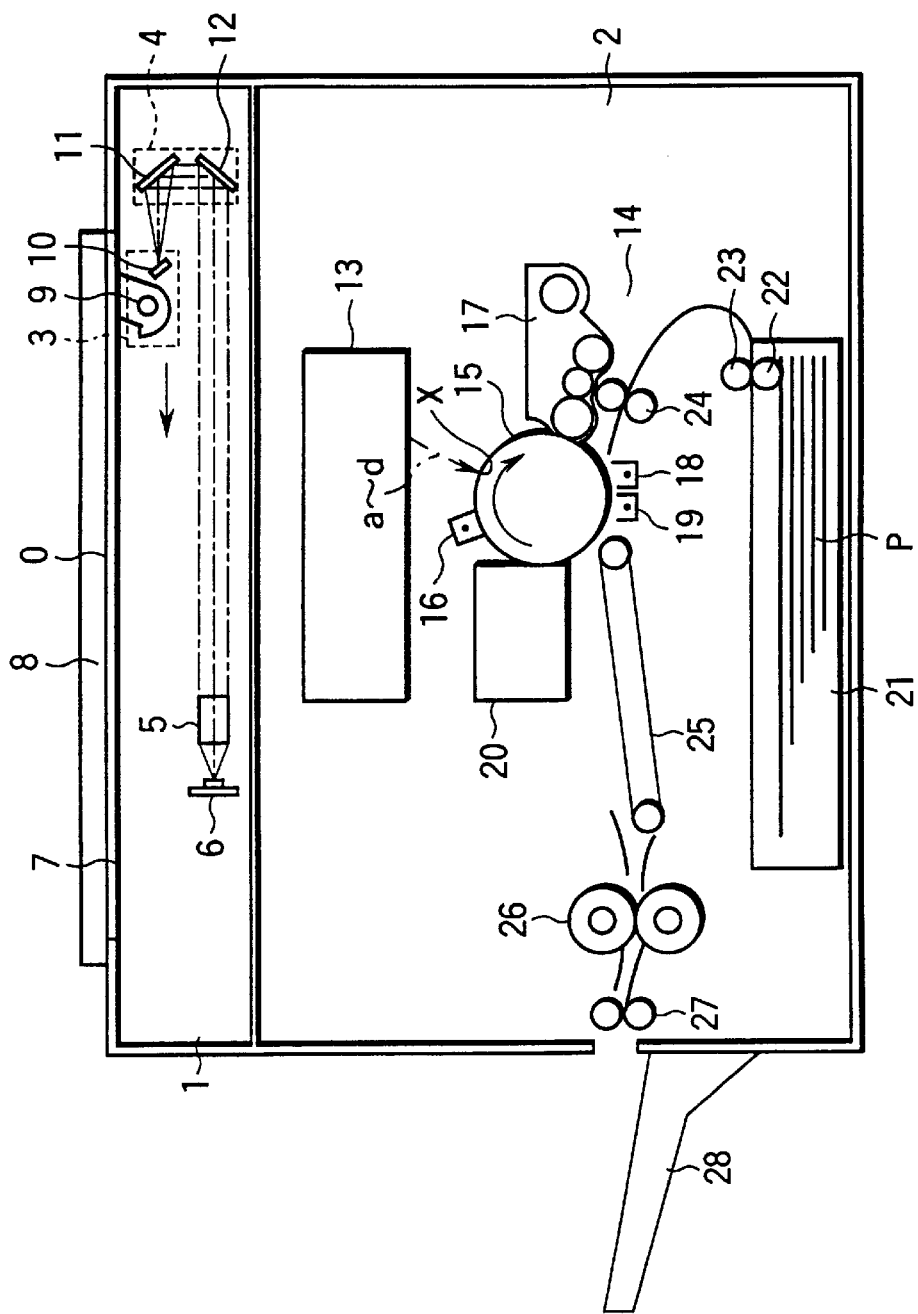
FIG. 1 schematically shows the configuration of a digital copying machine according to an embodiment of the present invention.

FIG. 1 shows the configuration of a digital copying machine, which is an image forming apparatus to which a light beam scanning apparatus according to an embodiment of the present invention is applied. The digital copying machine includes a scanner unit 1 acting as image reading means and a printer unit 2 acting as image forming means. The scanner unit 1 is composed of a first carriage 3 and a second carriage 4 which are movable in the direction of the arrow, an image formation lens 5, and a photoelectric conversion element 6.

In FIG. 1, a document O is placed on an document table 7 made of transparent glass, with the printed side downward. The placement reference of the document is at the front right on the lateral side along the width of the document table 7. A document holding cover 8 that can be opened and closed presses the document O against the document table 7.

A light source 9 illuminates the document 9. The reflected light from the document passes through mirrors 10, 11, 12 and the image formation lens 5 and is gathered on the light-receiving surface of the photoelectric conversion element 6. The first carriage 3 on which the light source 9 and mirror 10 are mounted and the second carriage 4 on which the mirrors 11, 12 are mounted move at a relative speed in the ratio of 2:1 to make the optical path length constant. A carriage driving motor (not shown) moves the first carriage 3 and second carriage 4 from right to left in synchronization with a read timing signal.

In this way, the image of the document O on the document table 7 is read line by line by the scanner unit 1. The output of the scanner unit 1 is converted by an image processing unit (not shown) into an 8-bit digital signal indicating the gradation of image.

The printer unit 2 is composed of an optical system unit 13 and an image forming unit 14 using an electronic photographic system capable of forming an image on a sheet of paper P serving as a medium on which an image is to be formed. Specifically, the image signal read from the document O by the scanner unit 1 is processed at the image processing unit (not shown) and then converted into laser beams (hereinafter, referred to as light beams) from semiconductor laser oscillators. The optical system of the embodiment uses a multi-beam optical system using more than one semiconductor laser oscillator.

The configuration of the optical system unit 13 will be explained in detail later. The semiconductor laser oscillators provided in the unit emit light according to the laser modulation signal outputted from the image processing unit (not shown). The light beams from the semiconductor laser oscillators are reflected by a polygon mirror and outputted to the outside of the unit in the form of scanning light.

The light beams from the optical system unit 13 form a spot with the necessary resolution at point X, the exposure position on a photosensitive drum 15 serving as an image retaining member. The spot is caused to scan the photosensitive drum 15 for exposure. This makes an electrostatic latent image corresponding to the image signal appear on the photosensitive drum 15.

Around the photosensitive drum 15, there are provided an electrifying charger 16 for electrifying the surface of the drum, a developing unit 17, a transfer charger 18, a peeling charger 19, and a cleaner 20. The photosensitive drum 15 is rotated by a driving motor (not shown) at a specific circumferential speed. It is electrified by the electrifying charger 16 facing the surface of the drum. More than one light beam (or scanning light beam) forms a spot at point X, the exposure position on the electrified photosensitive drum 15.

The electrostatic latent image formed on the photosensitive drum 15 is developed with the toner (or developer) from the developing unit 17. The toner image formed on the photosensitive drum 15 is transferred at the transfer position onto the sheet P fed with a suitable timing by the paper feed system.

In the paper feed system, sheets of paper P in a paper feed cassette 21 are taken out one by one by a supply roller 22 and a separation roller 23. The sheet P is sent to a resist roller 24, which carries the sheet to the transfer position with a specific timing. On the downstream side of the transfer charger 18, there are provided a sheet transport mechanism 25, a fixing unit 26, and delivery rollers 27 for discharging the sheet P on which an image has been formed. With this arrangement, the fixing unit 26 fixes the toner image on the sheet P on which the toner image has been transferred. Thereafter, the sheet is discharged via the delivery rollers 27 into a delivered sheet tray 28 outside.

After the image has been transferred from the photosensitive drum 15 to the sheet P, the remaining toner on the surface of the drum is removed by the cleaner 20, which returns the drum to the initial state. In this state, the drum stands by to form the next image.

The repetition of the aforementioned processes causes the operation of forming images to be performed continuously.

As described above, the document O on the document table 7 is read at the scanner unit 1. The read data is subjected to a series of processes at the printer unit 2 and then recorded on the sheet P in the form of a toner image.

The following is explanation of the optical system unit 13.

Figure 2:
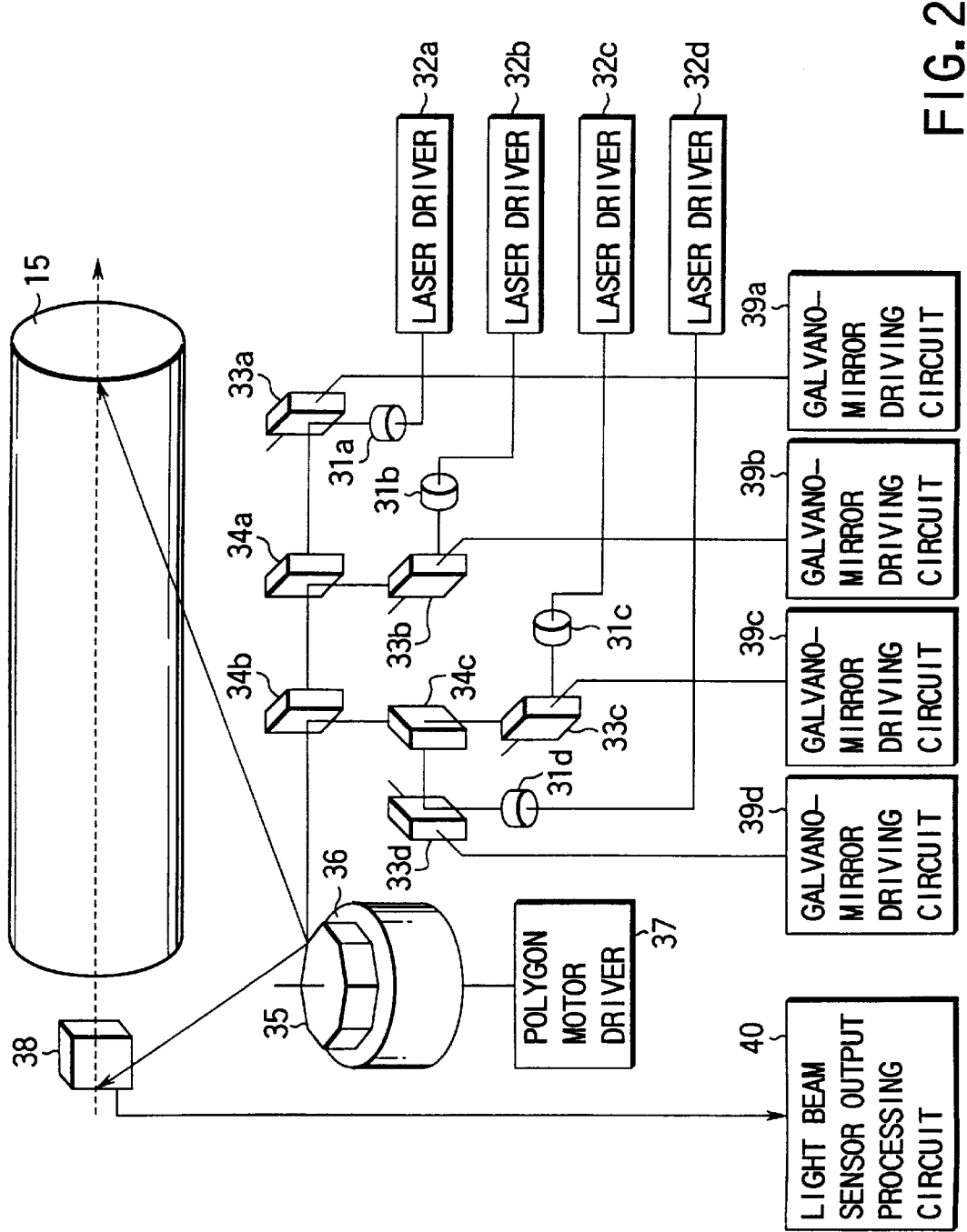
FIG. 2 shows the configuration of an optical system unit and the location of a photosensitive drum.

FIG. 2 shows the configuration of the optical system unit 13 and the location of the photosensitive drum 15. The optical system unit 13 includes, for example, semiconductor laser oscillators 31a, 31b, 31c, 31d, serving as four light-beam generating means. The semiconductor laser oscillators 31a, 31b, 31c, 31d scan line by line simultaneously, enabling an image to be formed at high speed without increasing the number of revolutions of the polygon mirror.

Specifically, the laser oscillator 31a is driven by a laser driver 32a. The outputted light beam passes through a collimator lens (not shown) and strikes a galvanomirror 33a serving as optical path changing means. The light beam reflected from the galvanomirror 33a passes through a half mirror 34a and a half mirror 34b and strikes a polygon mirror 35 acting as a multiplanar rotation mirror.

The polygon mirror 35 is rotated at a constant speed by a polygon motor 36 driven by a polygon motor driver 37. This causes the reflected light from the polygon mirror 35 to scan in a constant direction at an angular velocity determined by the number of revolutions of the polygon motor 36. The light beam moved to and fro by the polygon mirror 35 passes through an f-θ lens (not shown). The f-θ characteristic of the lens enables the light beam to scan the light-receiving surface of a light beam sensing unit 38 and the surface of the photosensitive drum 15 at a constant speed. The beam sensing unit 38 serves as light-beam passage sensing means and light-beam position sensing means.

The laser oscillator 31b is driven by a laser driver 32b. The outputted light beam passes through a collimator lens (not shown) and is reflected by a galvanomirror 33b and then by the half mirror 34a. The reflected light from the half mirror 34a passes through the half mirror 34b and strikes the polygon mirror 35. The optical path through which the beam travels after the polygon mirror 35 is the same as that for the laser oscillator 31a. Namely, the light beam passes through the f-θ lens (not shown) and scans the light-receiving surface of the light beam sensing unit 38 and the surface of the photosensitive drum 15 at a constant speed.

The laser oscillator 31c is driven by a laser driver 32c. The outputted light beam passes through a collimator lens (not shown) and is reflected by a galvanomirror 33c. The reflected light passes through a half mirror 34c, is reflected by the half mirror 34b, and strikes the polygon mirror 35. The optical path through which the beam travels after the polygon mirror 35 is the same as that for the laser oscillator 31a or 31b. Namely, the light beam passes through the f-θ lens (not shown) and scans the light-receiving surface of the light beam sensing unit 38 and the surface of the photosensitive drum 15 at a constant speed.

The laser oscillator 31d is driven by a laser driver 32d. The outputted light beam passes through a collimator lens (not shown) and is reflected by a galvanomirror 33d. The reflected light is further reflected by the half mirror 34c and then by the half mirror 34b, and strikes the polygon mirror 35. The optical path through which the beam travels after the polygon mirror 35 is the same as that for the laser oscillator 31a, 31b, or 31c. Namely, the light beam passes through the f-θ lens (not shown) and scans the light-receiving surface of the light beam sensing unit 38 and the surface of the photosensitive drum 15 at a constant speed.

Each of the laser drivers 32a to 32d includes an automatic power control (APC) circuit. The APC circuits cause the laser oscillators 31a to 31d to emit light constantly at the light-emitting power level set by a main control unit (CPU) 51, which will be explained later.

The light beams from the separate laser oscillators 31a, 31b, 31c, 31d are combined at the half mirrors 34a, 34b, 34c to form four light beams, which travel toward the polygon mirror 35.

This enables the four light beams to scan the photosensitive drum 15 simultaneously. As a result, if the number of revolutions of the polygon mirror 35 is the same, use of the four light beams will enable an image to be recorded at a speed four times as fast as that achieved by use of a single light beam in the prior art.

The galvanomirrors 33a, 33b, 33c, 33d are for adjusting (or controlling) the positional relationship between the light beams in the sub-scanning direction (or in the direction perpendicular to the main scanning direction). Galvanomirror driving circuits 39a, 39b, 39c, 39d are connected to the galvanomirrors 33a, 33b, 33c, 33d, respectively.

The light beam sensing unit 38 is for sensing the passing position, passing timing, and power of each of the four light beams. It is provided near one end of the photosensitive drum 15 in such a manner that the light-receiving surface of the unit 38 becomes flush with the surface of the photosensitive drum 15. Control of the galvanomirrors 33a, 33b, 33c, 33d corresponding to the respective light beams (or image formation position control in the sub-scanning direction), control of the light-emitting power (or intensity) of the laser oscillators 31a, 31b, 31c, 31d, and control of the light emitting timing (or image formation position control in the main scanning direction) are performed on the basis of the sense signal from the light beam sensing unit 38. A light-beam sensor output processing circuit 40 is connected to the light beam sensing unit 38 to generate the signals for performing the above controls.

The following is explanation of the light beam sensing unit 38.

Figure 3:
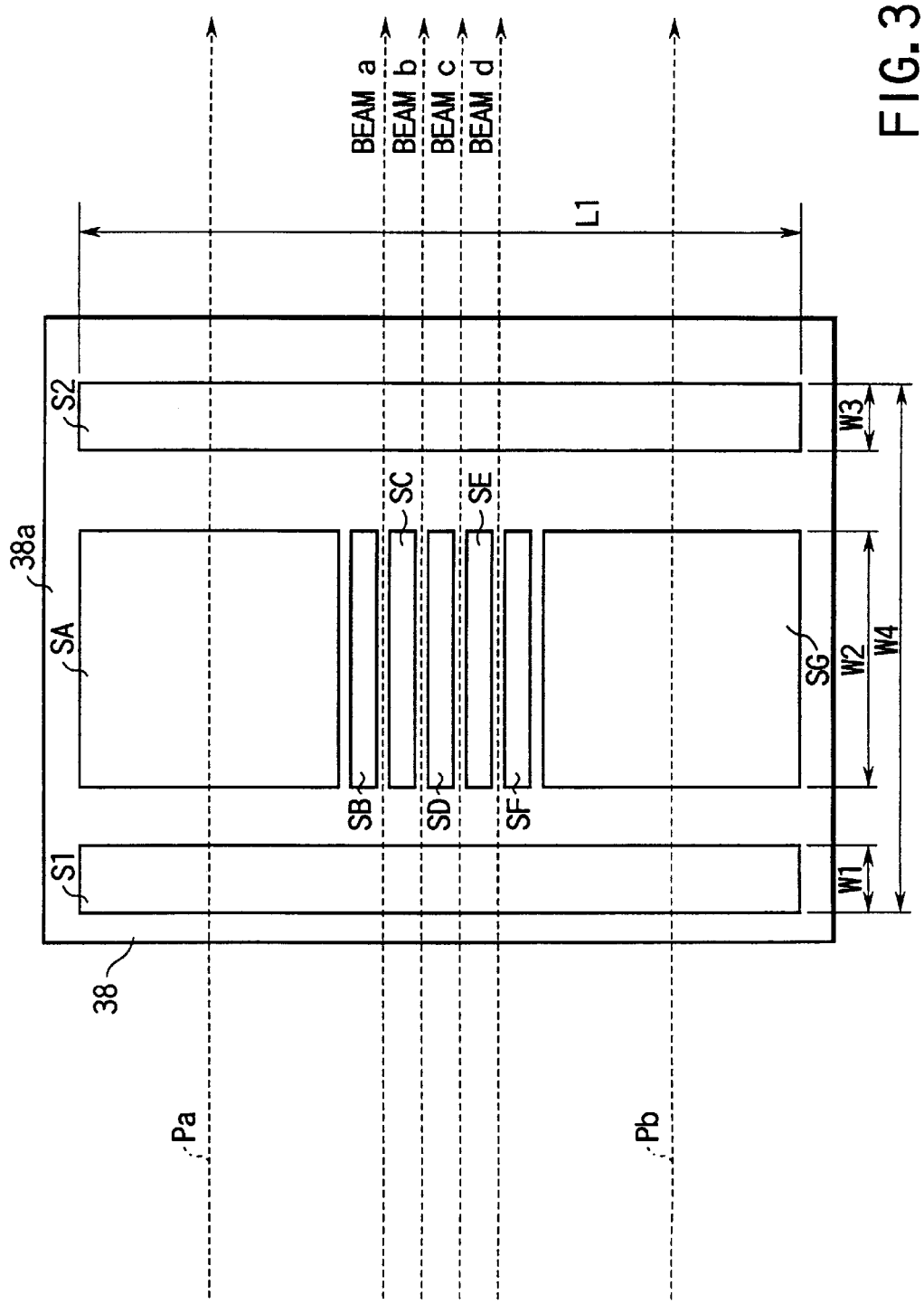
FIG. 3 schematically shows the configuration of a light beam sensing unit.

FIG. 3 pictorially shows how the structure of the light beam sensing unit 38 is related to the direction in which the light beams scan. The four light beams a to d from the four semiconductor laser oscillators 31a, 31b, 31c, 31d scan as the polygon mirror 35 rotates in such a manner that they traverse over the light beam sensing unit 38 from left to right.

The light beam sensing unit 38 comprises two oblong sensor patterns S1, S2 acting as a first light sensing section, seven sensor patterns SA, SB, SC, SD, SE, SF, SG sandwiched between the two sensor patterns S1, S2 and serving as a second and a third light sensing section, and a holding substrate 38a serving as a holding member for integrally holding the sensor patterns S1, S2, SA, SB, SC, SD, SE, SF, SG. The sensor patterns S1, S2, SA to SG are composed of, for example, photodiodes.

The sensor pattern S1 is a pattern that senses the passing of a light beam and generates a reset signal (or an integration start signal) for an integrator explained later. The sensor pattern S2 is a pattern that senses the passing of a light beam and generates a conversion start signal for an A/D converter explained later. The sensor patterns S1, S2 function as reference patterns in various control actions in the main scanning direction. Each of the sensor patterns SA to SG is a pattern that senses the passing of a light beam.

As shown in FIG. 3, the sensor patterns S1, S2 are formed oblong in the direction perpendicular to the direction in which the light beams scan so that the light beams a to d deflected by the polygon mirror 35 never fail to traverse them, regardless of the positions of the galvanomirrors 33a to 33d. For example, in the embodiment, the width W1 of the pattern S1 and the width W3 of the pattern S2 in the main scanning direction are 200 μm, whereas the length L1 of them in the direction perpendicular to the direction in which the light beams scan is 2000 μm.

The sensor patterns SA to SG are arranged in such a manner that they are stacked one on top of another in the direction perpendicular to the direction of light beam scanning between the sensor patterns S1 and S2 as shown in FIG. 3. The length along which they are arranged is L1, the same length as that of the sensor patterns S1, S2. The width W2 of each of the sensor patterns SA to SG in the direction of light beam scanning is, for example, 600 μm.

To sense the power of the light beam on the photosensitive drum 15, the passing position of the light beam is controlled so that the light beam may pass over sensor pattern SA or SG as shown by a broken-line arrow Pa or Pb in FIG. 3. Then, the output of sensor pattern SA or SG is taken in.

The following is explanation of the control system.

Figure 4:
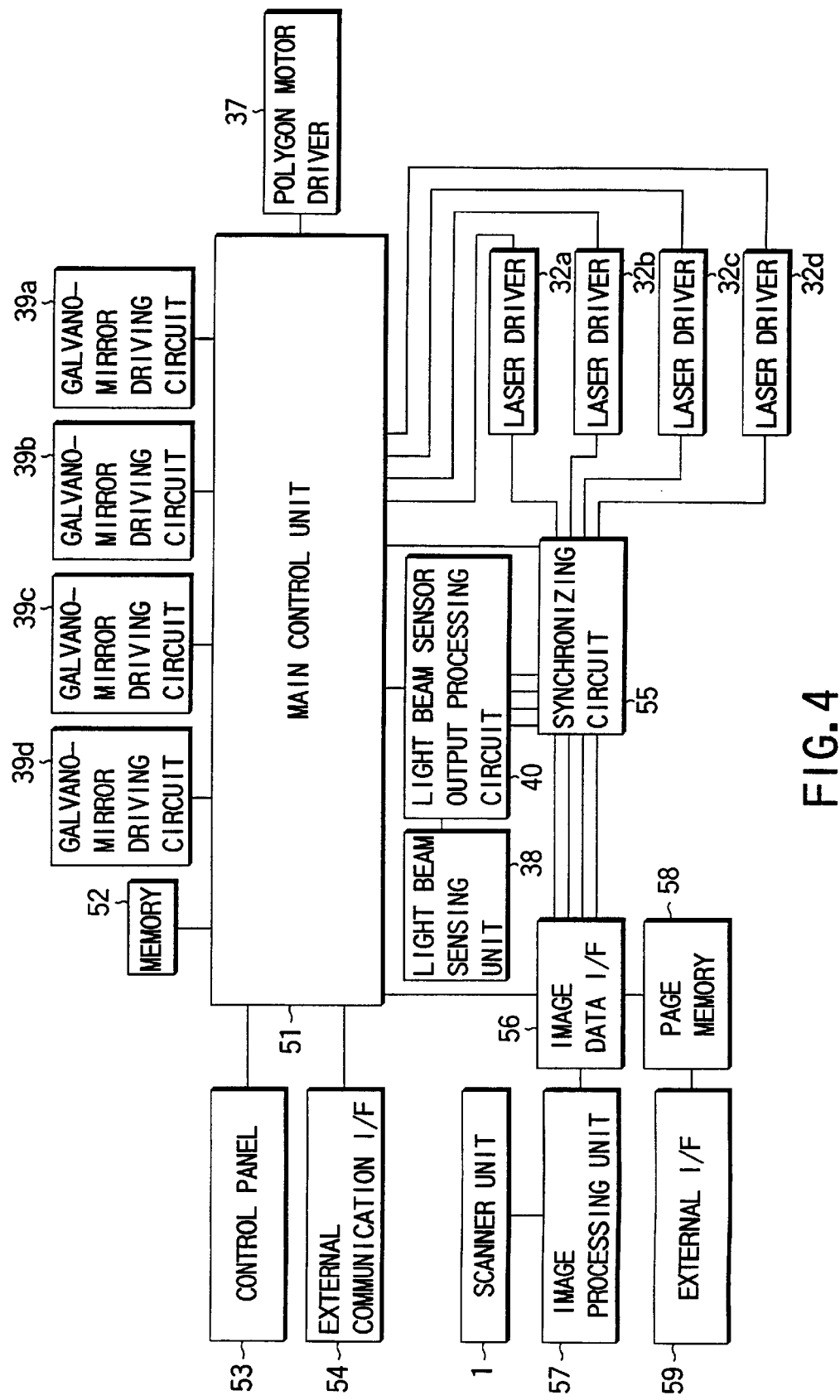
FIG. 4 is a block diagram of a control system for mainly controlling the optical system.

FIG. 4 shows the control system for mainly controlling the multi-beam optical system. Numeral 51 indicates a main control unit 51 which is composed of, for example, a CPU, and supervises the overall control. Connected to the main control unit 51 are a memory 52, a control panel 53, an external communication interface (I/F) 54, the laser drivers 32a, 32b, 32c, 32d, the polygon mirror motor driver 37, the galvanomirror driving circuits 39a, 39b, 39c, 39d, the light beam sensor output processing circuit 40, a synchronizing circuit 55, and an image data interface (I/F) 56.

The image data I/F 56 is connected to the synchronizing circuit 55. An image processing unit 57 and a page memory 58 are connected to the image data I/F 56. The scanner unit 1 is connected to the image processing unit 57. An external interface (I/F) 59 is connected to the page memory 58.

The flow of image data in forming an image will be explained briefly.

As explained earlier, in a copying operation, the image on the document 0 set on the document table 7 is read by the scanner unit 1 and the read signal is sent to the image processing unit 57. The image processing unit 57 subjects the image signal from the scanner unit 1 to known shading correction, various filtering processes, gray level processing, and gamma correction.

The image data from the image processing unit 57 is sent to the image data I/F 56. The image data I/F 56 distributes the image data to the four laser drivers 32a, 32b, 32c, and 32d.

The synchronizing circuit 55 generates a clock synchronizing with the timing with which each light beam passes over the light beam sensing unit 38 and sends the image data from the image data I/F 56 to the laser drivers 32a, 32b, 32c, and 32d as a laser modulation signal in synchronization with the clock.

Transferring the image data in synchronization with the scanning of each light beam enables an image to be formed (in the proper position) synchronously in the main scanning direction.

The synchronous circuit 55 includes a sample timer and a drum exposure inhibit timer. The sample timer forces the laser oscillators 31a, 32b, 31c, 31d to emit light in non-image areas and controls the power of each light beam. The drum exposure inhibit timer prevents the forced light emission by the main control unit 51 from exposing the photosensitive drum 15 in performing control of the light-beam passing (or scanning) position or control of the powers of the individual light beams, which will be explained later.

The control panel 53 is a man-machine interface for starting a copying operation or setting the number of sheets of paper.

The digital copying machine of the embodiment can not only make copies but also form images from the image data externally supplied via the external I/F 59 connected to the page memory 58. The image data supplied from the external I/F 59 is temporarily stored in the page memory 58 and then sent to the synchronizing circuit 55 via the image data I/F 56.

When the digital copying machine is externally controlled via a network, the external communication I/F 54 serves as the control panel 53.

The galvanomirror driving circuits 39a, 39b, 39c, and 39d are circuits for driving the galvanomirrors 33a, 33b, 33d, and 33d according to the specified values from the main control unit 51. Therefore, the main control unit 51 can control the angles of the galvanomirrors 33a, 33b, 33d, and 33d freely via the galvanomirror driving circuits 39a, 39b, 39c, and 39d.

The polygon motor driver 37 is a driver for driving the polygon motor 36 for rotating the polygon mirror 35 that deflects the four light beams. The main control unit 51 instructs the polygon motor driver 37 to start and stop rotation or change the number of revolutions. Changing the number of revolutions is effected when the recording pitch (or resolution) is changed.

The laser drivers 32a, 32b, 32c, 32d have the function of not only emitting laser light according to the laser modulation signal in synchronization with the scanning of the line beam from the synchronizing circuit 55 but also forcing the laser oscillators 31a, 31b, 31c, 31d to emit light according to the forced light-emitting signal from the main control unit 51, regardless of the image data.

The function is used when the laser oscillators 31a, 31b, 31c, 31d are forced to emit light in performing control of the light-beam passing (or scanning) position or control of the powers of the individual light beams. As explained earlier, however, the drum exposure inhibit timer in the synchronizing circuit 55 prevents the forced light emission over the photosensitive drum 15.

The main control unit 51 sets the power produced by each of the laser oscillators 31a, 31b, 31c, 31d in the respective laser drivers 32a, 32b, 32c, 32d. The setting of the light-emitting power is changed according to changes in the processing conditions or the sensing of the passing position of the light beam.

The memory 52 is for storing the necessary data for control. It stores, for example, the controlled variables for the galvanomirrors 33a, 33b, 33c, 33d, the characteristic of a circuit for sensing the passing position of a light beam (or the offset value of an amplifier), and the printing area corresponding to each light beam. This enables the optical system unit 13 to be brought into the image formation mode immediately after the power supply has been turned on.

Hereinafter, light-beam position control (or printing area setting) in the main scanning direction will be explained in detail.

Figure 5:
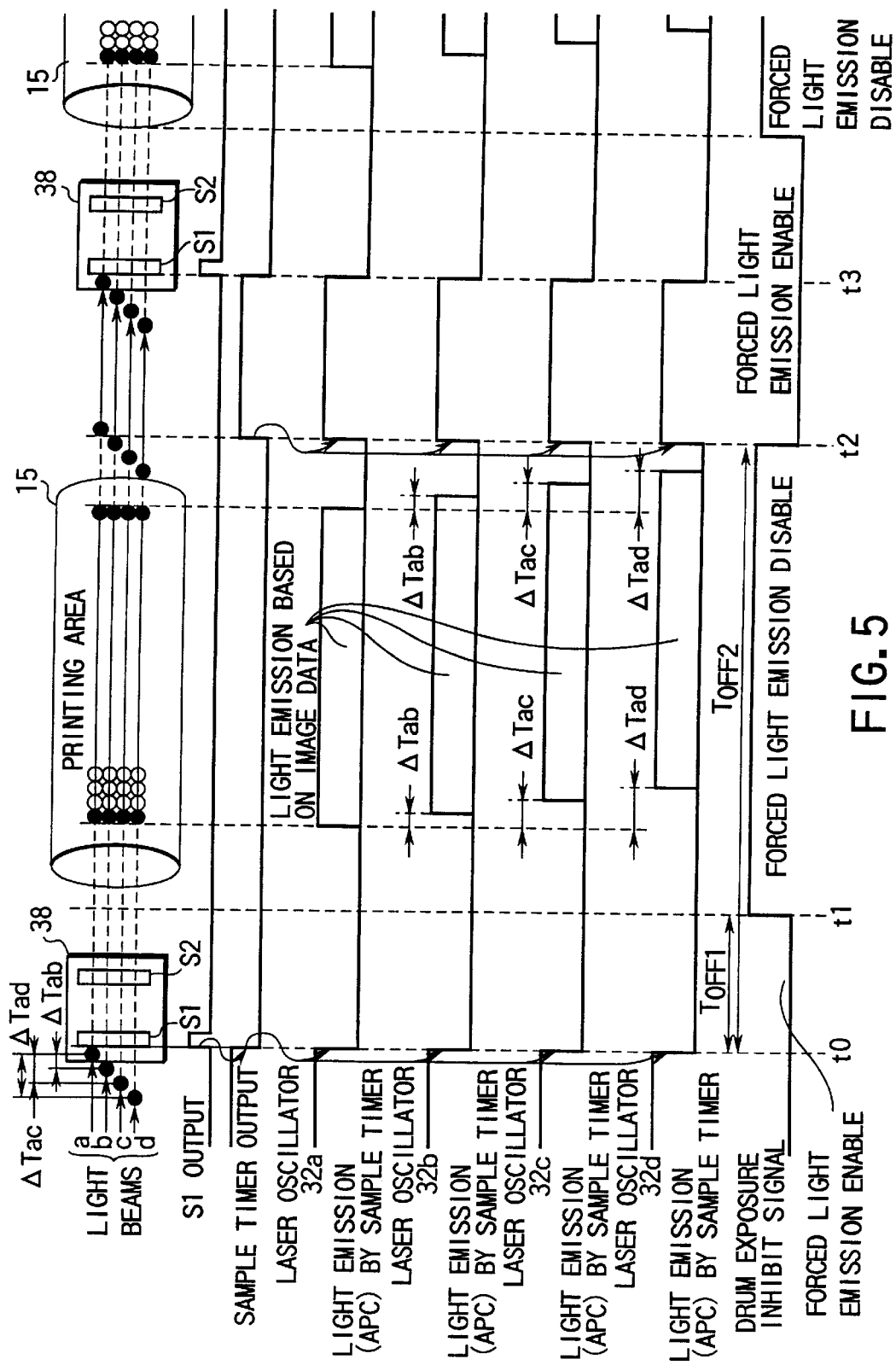
FIG. 5 shows the positional relationship between the light beam sensing unit and the photosensitive drum and the exposure area (printing area) of each light beam by a sample timer as well as the positional relationship between light-emitting areas by image data together with a time chart.

FIG. 5 shows the positional relationship between the sensor patterns S1, S2 of the light beam sensing unit 38 and the photosensitive drum 15 as well as the exposure area (printing area) of the light beams a to d by a sample timer explained later and the light-emitting area on the basis of the image data. FIG. 5 also shows the positional relationship with the output of the drum exposure inhibit timer together with a time chart. The circuit configuration to realize the operation will be explained in detail by reference to FIG. 6.

As shown in FIG. 5, the output of sensor pattern S1 in the light beam sensing unit 38 resets the sample timer (at time t0), which then starts to count the clock (not shown) from 0. When the count of the sample timer has reached a specific value, the output of the sample timer is high as shown at time t2, which forces the four laser oscillators 31a to 31d to emit light. The value set in the sample timer is normally such a value as causes the light beams a to d to be emitted before the next polygon mirror surface deflects them after they have passed the photosensitive drum 15, as shown in FIG. 5.

When the next polygon mirror surface has started to deflect the light beams a to d and the first light beam has reached sensor pattern S1 (at time t3), the sample timer is reset and the above-described operation is repeated. Specifically, the laser oscillators 31a to 31d are forced to emit light line by line in the area irrelevant to image formation at regular intervals of time (from time t2 to t3). During the forced light emission, automatic power control (APC) to keep the light-emitting power of a laser beam at a specific value is performed for each of the laser oscillators 31a to 31d.

The following is an explanation of the drum exposure inhibit timer. Forced light emission includes not only light emission by the output of the sample timer but also the aforementioned light emission that the main control unit 51 directly causes the laser drivers 32a to 32d to effect. In the forced light emission, the main control unit 51 causes any one of the laser oscillators 31a to 31d to emit light and the light to scan over the light beam sensing unit 38. In the scanning, light-beam passing (scanning) position control and light-beam power control of the beams are performed.

When the laser oscillators 31a to 31d are forced to emit light consecutively, the photosensitive drum 15 is exposed continuously, which leads to the following problems.

When the photosensitive drum 15 is at a stop, the beams expose a specific portion of the photosensitive drum 15 intensively, which can lead to a local degradation of the photosensitive drum 15. When the photosensitive drum 15 is rotating, a lot of toner may adhere (or are consumed) or the carrier may adhere to the drum.

The drum exposure inhibit timber avoids those problems. When the timer is in operation, it prevents the main control unit 51 from effecting forced light emission in the area (from time t1 to t2) including the photosensitive drum area, as shown in the time chart of FIG. 5. Specifically, the light beams pass over the light beam sensing unit 38 on the basis of the output of sensor pattern S1 of the light beam sensing unit 38. The forced emission is inhibited (the output of the drum exposure inhibit timer: high) before the light beams approach the photosensitive drum 15 (from time t2: $T_{OFF1}$ has elapsed since the output of S1). At the time when the light beams have finished passing over the photosensitive drum 15 (at time t2: $T_{OFF2}$ has elapsed since the output of S1), the inhibition of forced light emission is canceled (the output of the drum exposure inhibit timer: low).

Light emission on the basis of the image data (including the test image data) is normally effected on the printing area of the photosensitive drum 15 as shown in FIG. 5. In the case of a configuration where light beams are combined by a half mirror and caused to scan, the positional relationship between light beams in the main scanning direction is not constant. FIG. 5 shows a case where light beam a is at the head, followed by light beams b, c, and d in that order. As shown in FIG. 5, with light beam a as a reference, light beam b is delayed $\Delta$Tab, light beam c is delayed. $\Delta$Tac, and light beam d is delayed $\Delta$Tad.

To make the light beams a to d having such a positional (phase) relationship coincide exactly with the exposure area, it is necessary to shift the light-emitting timing based on the image data by $\Delta$Tab for light beam b, $\Delta$Tac for light beam c, and $\Delta$Tad for light beam d with light beam a as a reference as shown in FIG. 5.

In setting the exposure area, adjustments are generally made in units of one clock (or in units of one pixel) on the basis of a reference clock. In the optical system of the present embodiment, there is no guarantee the positions of the light beams are shifted in units of one clock. Therefore, closer adjustments are needed.

Figure 6:
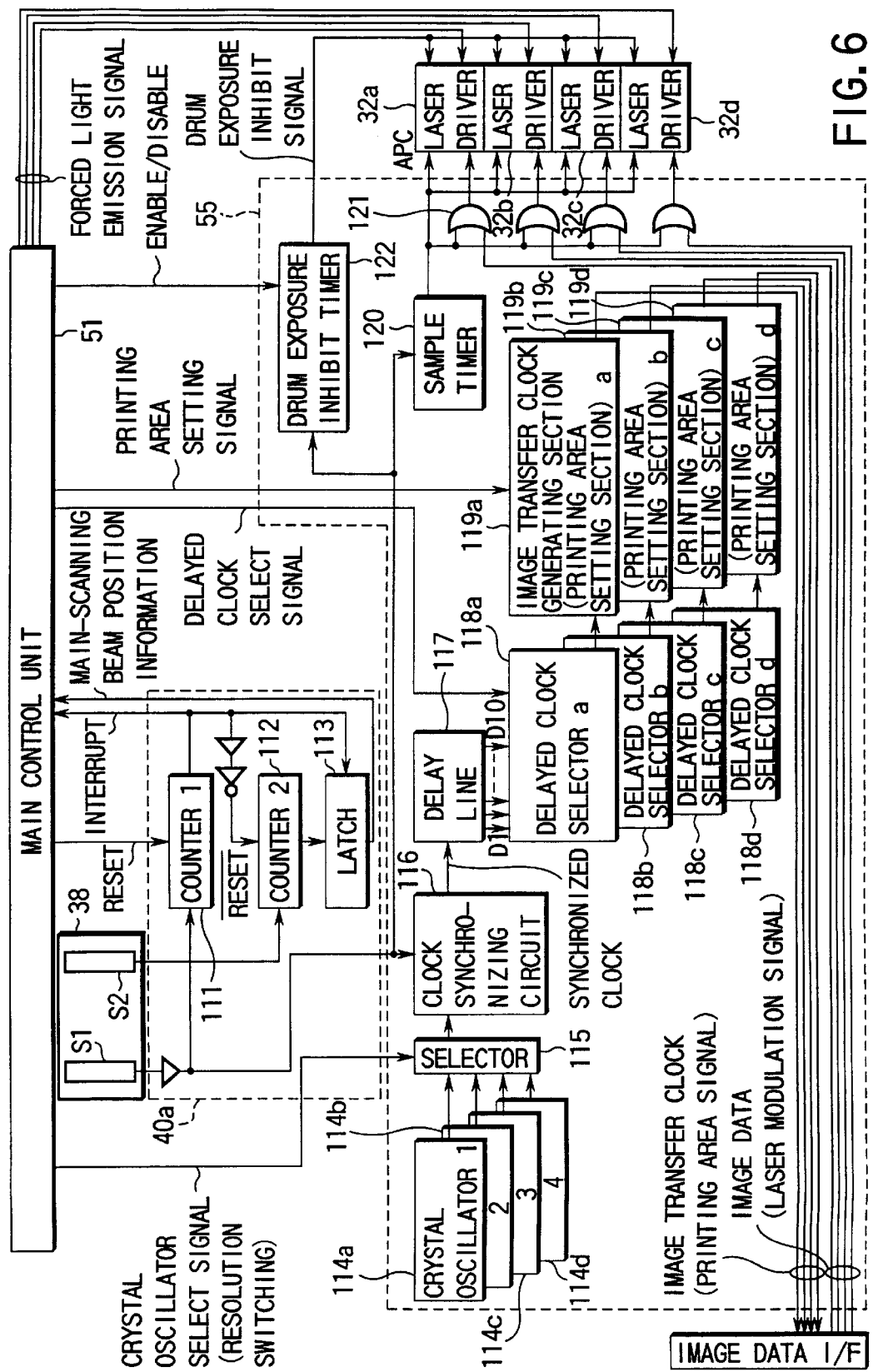
FIG. 6 is a block diagram of a configuration for setting a printing area (exposure area) in as small units as one clock or less.

FIG. 6 shows a configuration for setting the printing area (exposure area) in units of less than one clock and a configuration for preventing the forced light emission from exposing the drum. These configurations correspond to the synchronizing circuit 55, light beam sensor output processing circuit 40, and light beam sensing unit 38.

In FIG. 6, a main-scanning light-beam position sensing circuit 40a is composed of a first counter 111, a second counter 112, and a latch circuit 113.

The synchronizing circuit 55 comprises four crystal oscillators 114a to 114d, a selector 115 for selecting one of the crystal oscillators 114a to 114d, a clock synchronizing circuit 116, a delay line 117, four delay clock selectors 118a to 118d, four image transfer clock generating sections (printing area setting sections) 119a to 119d, a sample timer 120, an OR gate circuit 121, and a drum exposure inhibit timer 122. One of the crystal oscillators 114a to 114d is selected by the selector 115 according to image resolution.

More detailed explanation will be given by reference to FIG. 6.

First, the configuration for preventing the forced light emission from exposing the drum will be described. As shown in FIG. 6, the main control unit 51 is capable of sensing a forced light-emission signal to each of the laser drivers 32a to 32d and forcing the laser oscillators 31a to 31d to emit light.

The laser drivers 32a to 32d are designed not to receive the forced light-emission signal from the main control unit 51 during the time when the drum exposure inhibit timer 122 continues outputting the drum exposure inhibit signal (from time t1 to time t2 in FIG. 5). During the period, the laser oscillators 31a to 31d will not emit light even when the main control unit 51 has outputted the forced light-emission signal.

The operation of the drum exposure inhibit timer 122 is controlled by an enable/disable signal from the main control unit 51. In controlling the light-beam passing position and the power, the main control unit 51 outputs the enable signal to the drum exposure inhibit timer 122, which then starts to operate. Specifically, a drum exposure inhibit signal is outputted to the laser drivers 32a to 32d during the period from time t1 to time t2 in FIG. 5. Therefore, even when the main control unit 51 outputs the forced light-emission signal to the laser drivers 32a to 32d, the laser oscillators 31a to 31d are prevented from emitting light at least during the period. Accordingly, the values corresponding to time $T_{OFF1}$ and $T_{OFF2}$ in FIG. 5 are set in the drum exposure inhibit timer.

On the other hand, when a normal image is formed or when the laser drivers 32a to 32d operate according to the input image data, the main control unit 51 outputs the disable signal to the drum exposure inhibit timer 122. As a result, the drum exposure inhibit timer 122 is prevented from outputting the drum exposure inhibit signal, which allows the light beam to be projected onto the printing area on the drum according to the image data.

Therefore, in controlling the beam position and the power, the main control unit 51 outputs the enable signal to the drum exposure inhibit timer 122 and then the forced light-emission signal to the laser drivers 32a to 32d. As a result, the main control unit 51 can expose the light beam sensing unit 38 using any one of the light beams without taking into account the movement of the light beam (or without exposing the photosensitive drum 15).

Next, the configuration for setting the printing area (exposure area) in units of less than one clock will be described. As shown in FIG. 5, the sensor pattern S1 of the light beam sensing unit 38 is exposed by the first of the light beams a, b, c, and d forced by the sample timer 120 to emit light and changes the signal level from low to high. The high signal is inputted to the sample timer 120, which cancels all of the forced emission by the laser oscillators 31a to 31d.

Consequently, the light beams a, b, c, and d disappear and therefore the high output of the sensor pattern S1 also disappears.

Figure 7:
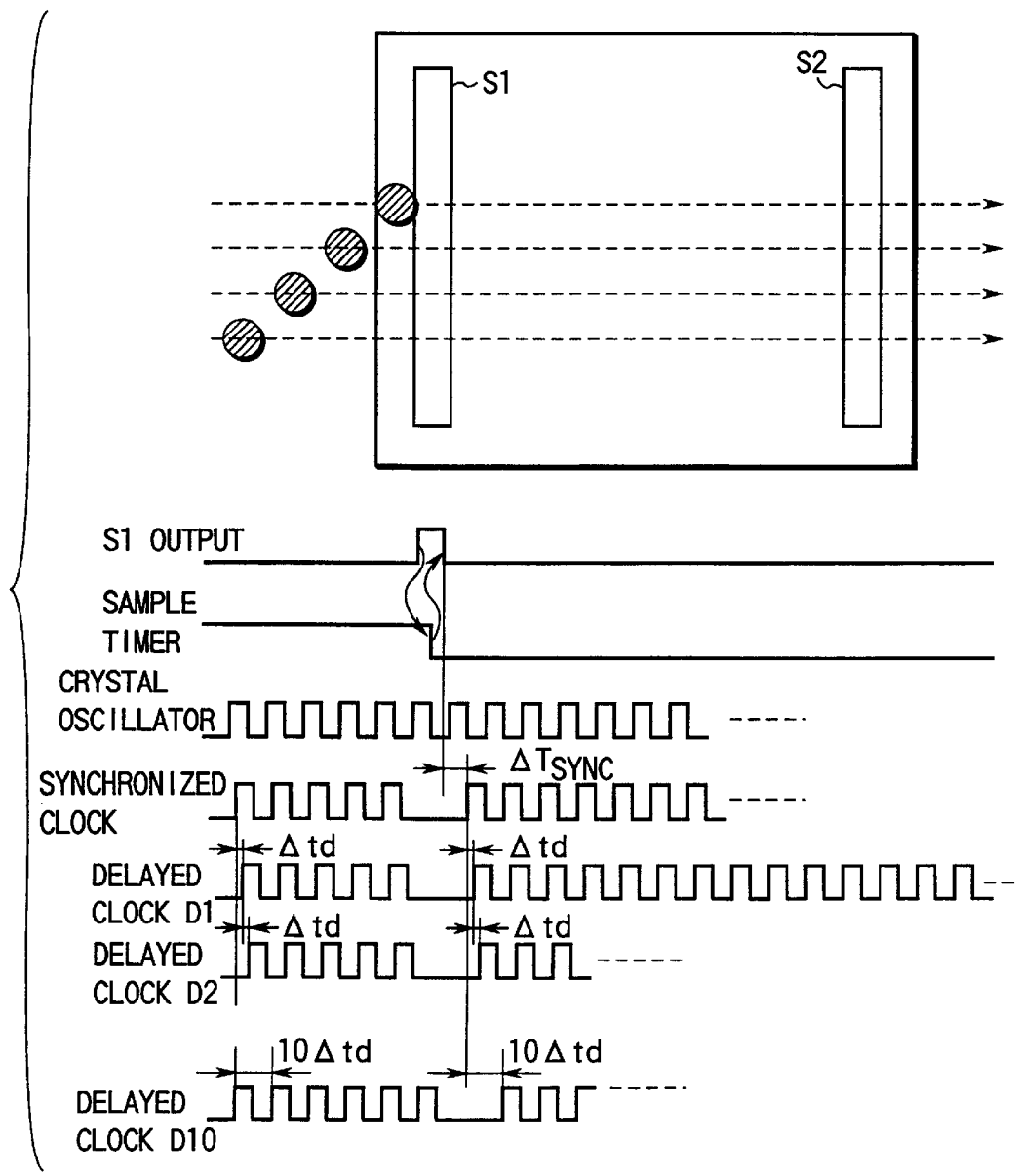
FIG. 7 is a diagram to help explain the operation of a clock synchronizing circuit.

The output of the sensor pattern S1 is also inputted to the clock synchronizing circuit 116 in the synchronizing circuit 55. The clock synchronizing circuit 116 outputs a synchronized clock. The synchronized clock is a clock that rises $\Delta T_{SYNC}$ after the trailing edge of the output of the sensor pattern S1 as shown in FIG. 7. The synchronized clock is also synchronized with the output of the sensor pattern S1 and has the same frequency as that of the output clock of the crystal oscillators.

Then, the synchronized clock is inputted to the delay line 117. The delay line 117 has the function of delaying the input signal for a specific time. The delay line 117 shown in the figure has ten taps for output. Specifically, delayed clock D1 outputted from a first-stage tap is delayed $\Delta$td from the inputted synchronized clock and delayed clock D2 outputted from a second-stage tap is delayed another $\Delta$td from the inputted synchronized clock. The delay of $\Delta$td is actually several nanoseconds.

Then, delayed clock D10 outputted from the last-stage (tenth-stage) tap is delayed 10·$\Delta$td from the inputted synchronized clock. In the embodiment, one-tenth of a period of the synchronized clock is almost equal to $\Delta$td. That is, the delayed clock D10 is almost equal to the inputted synchronized clock, or to a clock shifted one clock.

In the embodiment, the amount of delay in the delay line 117 is set at one-tenth of a clock. When the printing area has to be set more accurately, the amount of delay per tap should be made smaller and the number of taps be increased.

The outputs of the delay line 117, or the delayed clocks D1 to D10, are inputted to the delayed clock selectors 118a to 118*d* corresponding to the light beams a to d. The delayed clock selectors 118*a* to 118*d* has the function of selecting clocks and outputting them to the image transfer clock generating sections (printing area setting sections) 119*a* to 119*d* at the next stage on the basis of the delayed clock select signal outputted from the main control unit 51. In other words, the main control section 51 can freely select one from the delayed clocks D1 to D10 for each of the light beams a to d to set the setting area.

Here, the image transfer clock generating sections (printing area setting sections) 119*a* to 119*d* will be explained. Using the printing area setting signal, the main control unit 51 sets a printing area for each of the light beams a to d in units of one clock (in units of one pixel). Namely, it can set the output timing of the image transfer clock and the number of outputs. In forming a normal image, it sets those factors so that the image formation area for the light beams a to d may be a target image formation area on the photosensitive drum 15. The target image formation area varies with the sheet size to be used or the filing margin.

Now, the image transfer clock (printing area signal) thus obtained is sent to the image data I/F 56, which outputs the image data (laser modulation signals) corresponding to the light beams a to d in synchronism with the image transfer clock (printing area signal). The laser drivers 32*a* to 32*d* modulate the laser oscillators 31*a* to 31*d* on the basis of the image data (laser modulation signal). The clock signal outputted from the image transfer clock generating section during the main scanning position adjustment is used as an exposure pixel clock. The corresponding laser oscillator 31 is forced to emit light during the clock generation period.

In this way, the main control unit 51 can set a printing area in the image transfer clock generating sections (printing area setting sections) 119*a* to 119*d* in units of one clock (in units of one pixel) on the basis of the printing area setting signal. It can also set a printing area in units of one-tenth of a clock (in units of one-tenth of a pixel) for each of the light beams a to d by the delayed clock select signals to the delayed clock selectors 118*a* to 118*d*.

Next, the principle of acquiring main-scanning beam position information about the light beams a to d for the main control unit 51 to set a printing area in units of one clock (in units of one pixel) or in units of one-tenth of a clock (in units of one-tenth of a pixel) will be explained by reference to FIG. 8.

Figure 8:
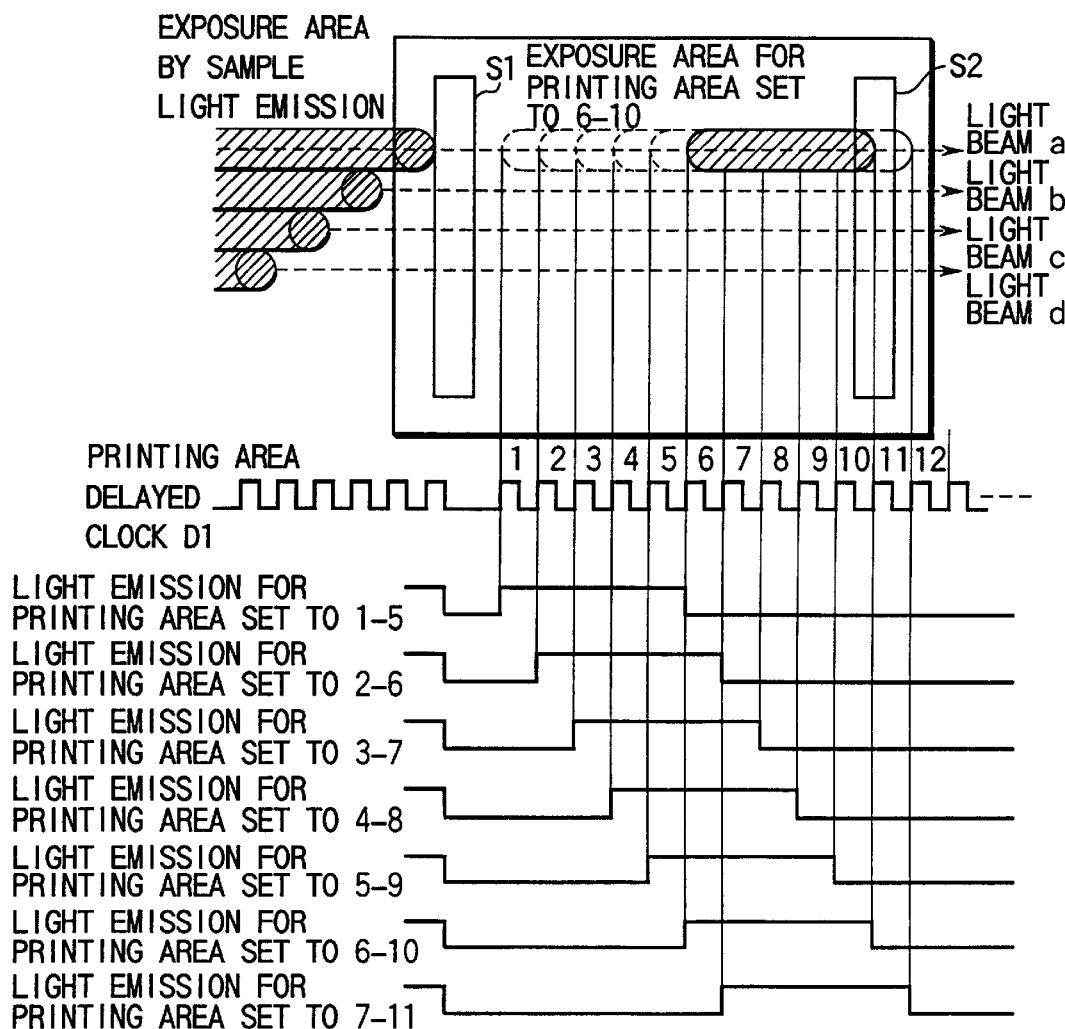
FIG. 8 is a diagram to help explain the principle of a method of acquiring information on the main scanning beam position for each light beam.

FIG. 8 shows a case where a much smaller exposure area than in forming a normal image has been set in the image transfer clock generating section (printing area setting section) 119*a*. The main control unit 51 first selects delayed clock D1 for, for example, light beam a, sets a printing area to 1–5, and gives the image data I/F 56 a test printing instruction to paint black all over the area (or project laser light in the printing area). As shown in the figure, when the first beam (in this case, beam a) has exposed sensor pattern S1, all of the four beams a to d are turned off. Thereafter, only light beam a exposes the section of printing area 1–5.

As described above, when a small value is set for the printing area, the light beam does not reach the area of the photosensitive drum 15 and exposes the light beam sensing unit 38. In this state, monitoring the output of sensor pattern S2 on the downstream side of sensor pattern S1, the main control unit 51 determines what size the printing area should be set at in order to allow sensor pattern S2 to response. As seen from the example of FIG. 8, setting the printing area to 6–10 allows sensor pattern S2 to start to respond.

In this way, the main control unit 51 can sense the relative positional relationship of light beam a with the output of sensor pattern S1 in units of one clock (in units of one pixel).

Next, a method of sensing the relative positional relationship of light beam a with the output of sensor pattern S1 in units of less than one clock (in units of less than one pixel) will be explained by reference to FIG. 9. As explained in FIG. 8, when delayed clock D1 has been selected for light beam a, setting the printing area to 6–10 allows sensor pattern S2 to respond. Thus, the main control unit 51 reduces the set value of the printing area to 5–9 and changes the selection of the delayed clock.

Figure 9:
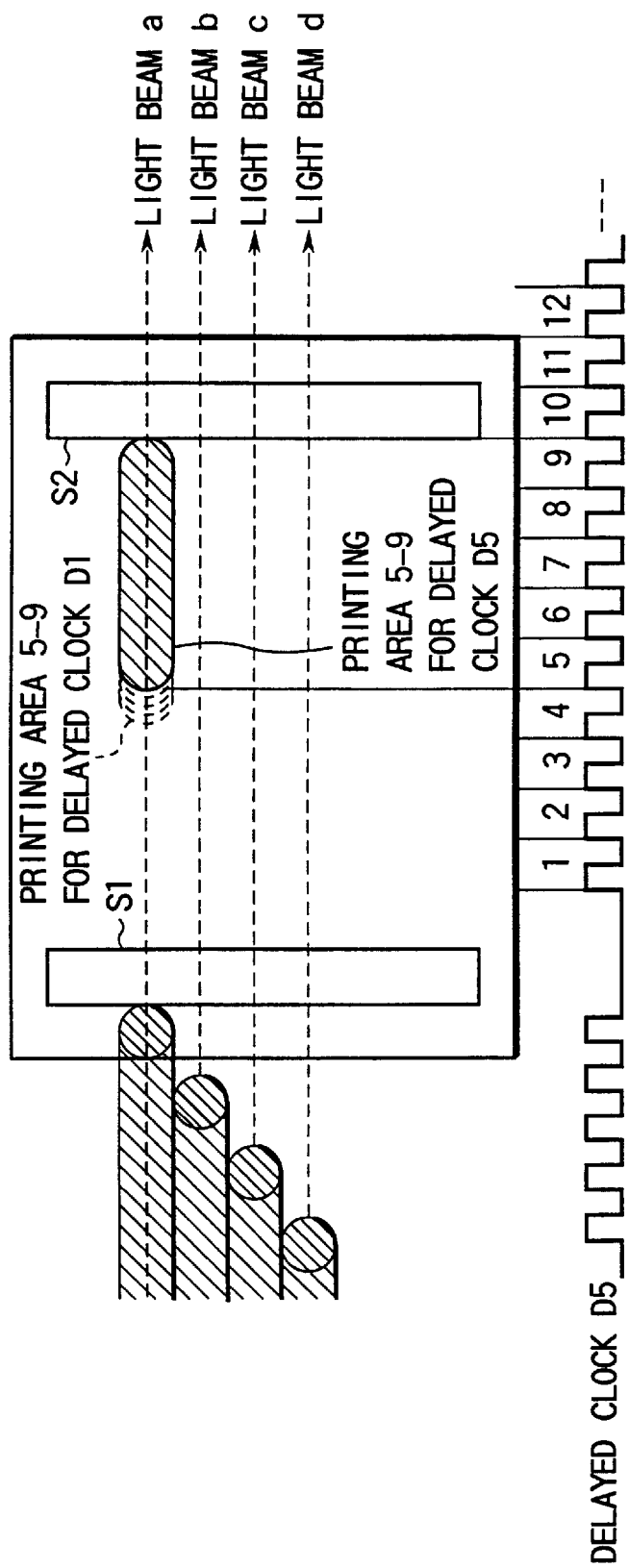
FIG. 9 is a diagram to help explain a method of sensing the relative positional relationship between each light beam and each output of the light beam sensing unit.

As shown in FIG. 9, as the selection of the delayed clock is changed in this order: D1→D2→D3, the printing area moves right in units of one-tenth of a clock (in units of one-tenth of a pixel). In the present embodiment, when delayed clock D5 has been selected, sensor pattern S2 starts to respond.

Therefore, in a case where the main control unit 51 has set the printing area (exposure area) to five pixels on the basis of the output of sensor pattern S1 for light beam a, has set the area to 5–9 and has selected delayed clock D5, it senses that the right end of the printing area has exposed sensor pattern. In other words, to expose the target area 5–9 overlapping with sensor pattern S2, the main control unit 51 has to select the tap D5 of the delay line 117 and set the delay pixel clock area corresponding to the target area (or the fifth to ninth delayed pixel clock areas after the output of sensor pattern S1).

Performing such a sensing operation on the light beams b, c, d makes it clear how each light beam is related in position to the output of sensor pattern S1 by the first light beam. In actual printing operation, the main control unit 51 selects the delayed clocks for the light beams a to d and sets the printing area, using the positional relationship as correction data. This enables the main control unit 51 to cause the image formation area for each beam to coincide with each other with an accuracy of one-tenth of a clock (one-tenth of a pixel).

The main control unit 51 stores the obtained information on the light beams a to d (information on the printing area and selection of delayed clock for each beam with respect to the first beam) in the memory 52. Storing the information in the memory 52 enables the apparatus to return to the original state as soon as the power supply is turned on again even after the power supply of the apparatus has been turned off.

Furthermore, even when a new printing area is set in the main scanning direction, storing the information in the memory 52 has the advantage of needing only small adjustments and therefore eliminating the necessity of using unnecessary time for control.

Next, the operation of the main-scanning light-beam position sensing circuit 40*a* in the light beam sensor output processing circuit 40 of FIG. 6 will be explained.

As explained earlier, the main control unit 51 can sense the light beam position in the main scanning direction by changing the selection of the delayed clocks for the light beams a to d or the printing area and monitoring the output of sensor pattern S2. Explanation will be given as to how the output of sensor pattern S2 is taken in by the main control unit 51.

Figure 10:
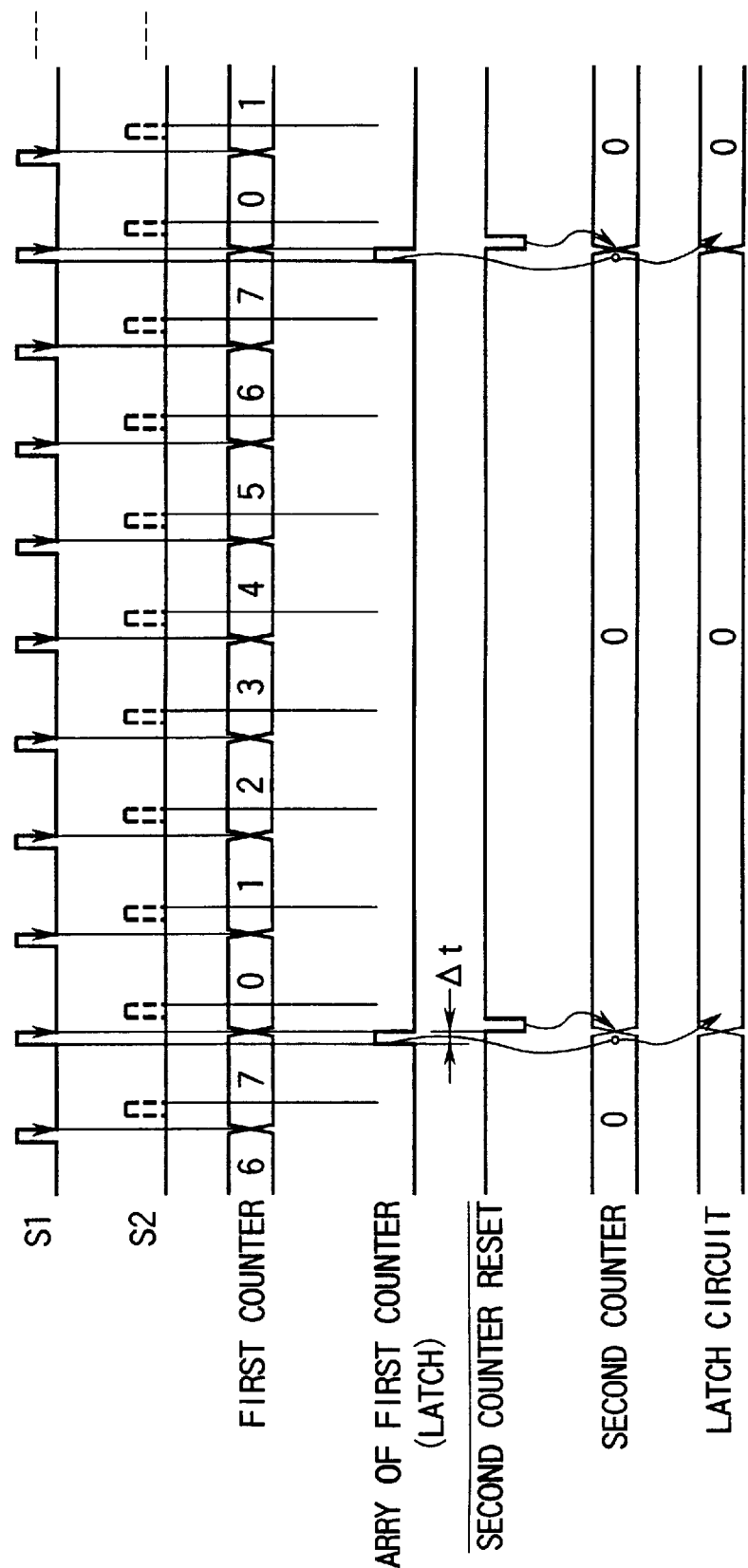
FIG. 10 is a diagram to help explain the operation of the main-scanning light-beam position sensing circuit.

FIG. 10 is a timing chart when the light beams a to d have not exposed sensor pattern S2 at all. As explained earlier, because the sample timer 120 forces the laser oscillators 31*a* to 31*d* to emit light, sensor pattern S1 outputs a pulse signal once in a scanning operation as a result of the first light beam exposing sensor pattern S1.

The first counter 111 is a counter for counting the pulse signal from sensor pattern S1. For example, it counts from 0 to 7 endlessly and outputs a carry signal at the end of the count of 7 as shown in the figure. The second counter is a counter for counting the output of sensor pattern S2.

The second counter 112 is cleared (reset) by the signal obtained by delaying the carry signal from the first counter 111. The count of the second counter 112 becomes 0 at intervals of eight scans.

The latch circuit 113 latches the output value of the second counter 112. The latch timing of the latch circuit 113 is the leading edge of the carry signal from the first counter 111. This enables the latch circuit 113 to hold the value before the second counter 112 is reset.

The value held in the latch circuit 113 is updated when the first counter 111 outputs the next carry signal. As a result, the latch circuit 113 always holds the count of the second counter 112 immediately before the arrival of the carry signal.

In FIG. 10, because sensor pattern S2 has not sensed a light beam at all, the count of the second counter 112 is always 0 and therefore the value held in the latch circuit 113 is also 0. As a result, the main control unit 51 can tell from the latched value of 0 that sensor pattern S2 has not sensed a light beam.

Figure 11:
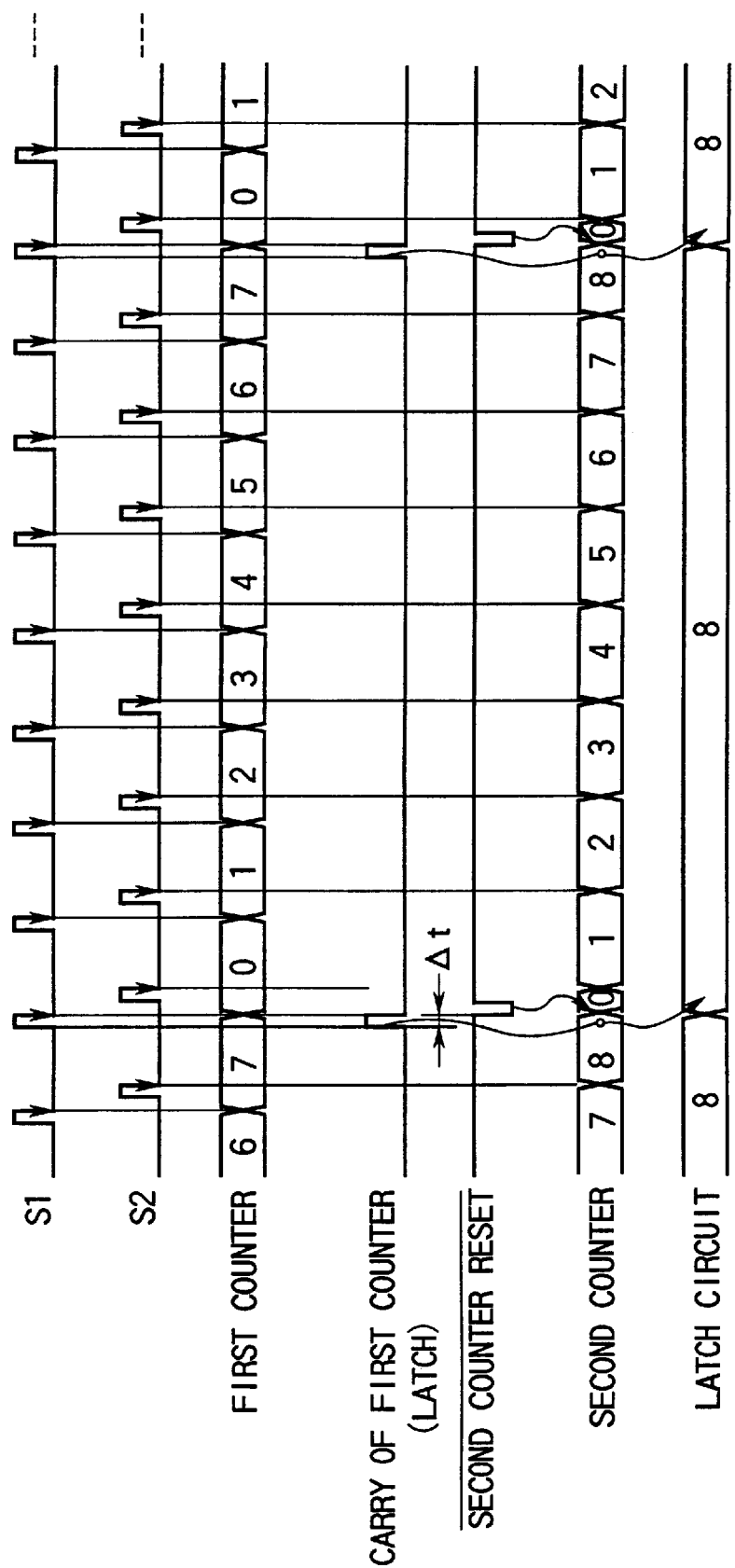
FIG. 11 is a diagram to help explain the operation of the main-scanning light-beam position sensing circuit.

FIG. 11 is a timing chart to help explain the operation when sensor pattern S2 is constantly sensing a light beam. As shown in FIG. 11, the second counter 112 for counting the output of sensor pattern S2 counts from 0 to 8 in response to the output of sensor pattern S2.

The operation will be explained briefly. As soon as the counter carry output delay signal has cleared (reset) the second counter 112, the output of sensor pattern S2 is inputted to the counter 112, which then has the count of 1.

Thereafter, the output of sensor pattern S2 increments the counter each time scanning is done. After scanning has been done eight times, the counter has the count of 8 and the value of 8 is held in the latch circuit with the timing that the first counter 111 outputs a carry signal. After the latch circuit 113 has held the value of 8, the second counter 112 is cleared (reset) to 0 and starts to count from 1.

While sensor pattern S2 is constantly sensing a light beam in this way, the value held in the latch circuit 113 is 8. As a result, when the value in the latch circuit 113 is 8, the main control unit 51 judges that sensor pattern S2 is constantly sensing a light beam.

Figure 12:
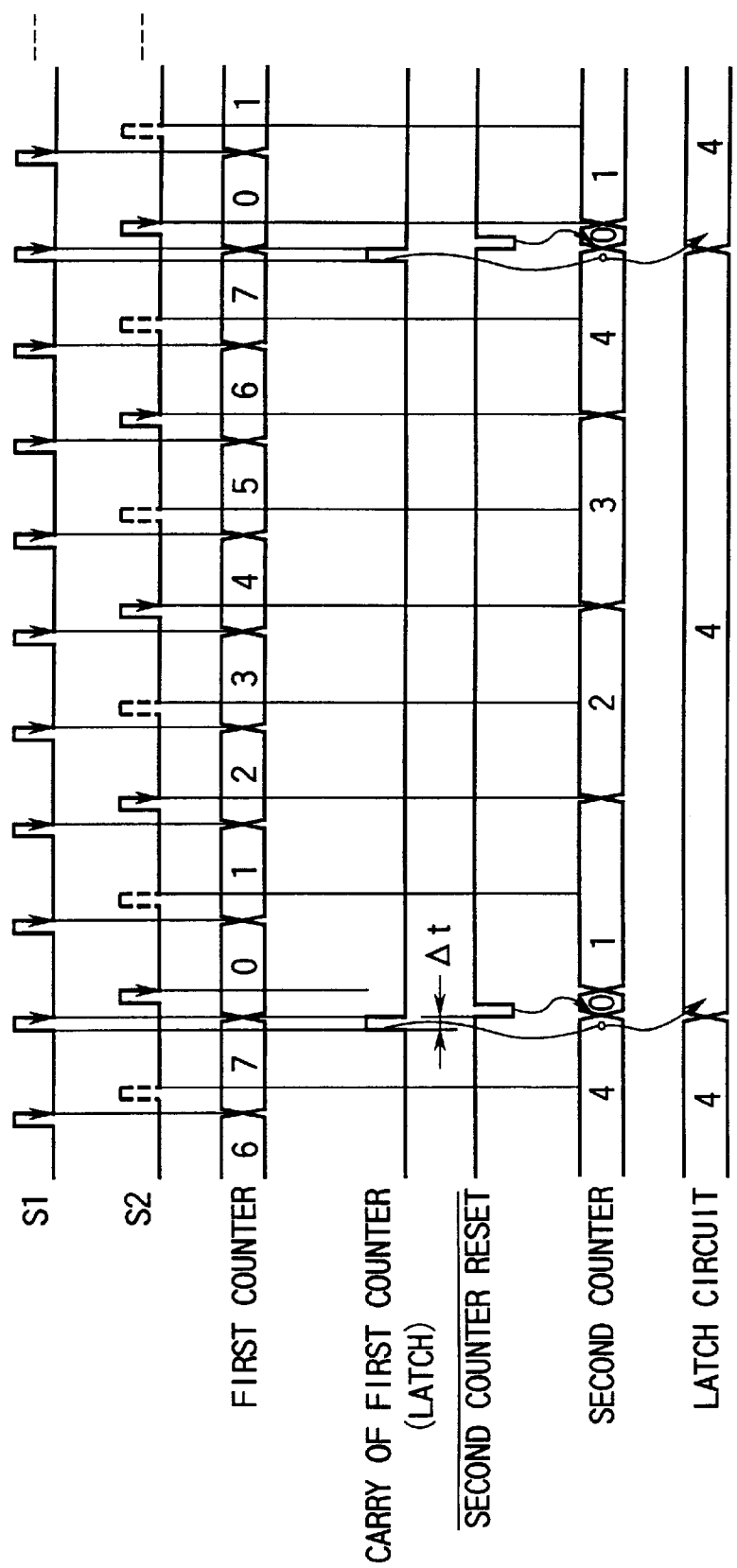
FIG. 12 is a diagram to help explain the operation of the main-scanning light-beam position sensing circuit.

FIG. 12 is a timing chart when sensor pattern S2 sometimes senses a light beam and sometimes not or is in a delicate condition. Because sensor pattern S2 sometimes senses a light and sometimes not, the count of the second counter 112 increases in a scanning operation and not in another scanning operation. In the embodiment, because sensor pattern S2 outputs a signal at intervals of two scan, the value held in the latch circuit 113 is 4. As a result, reading the value of 4 held in the latch circuit 113, the main control unit 51 judges that the edge of the printing area is related delicately in position to sensor pattern S2.

Counting the output of sensor patterns S2 more than once in this way has the following merits:

1) The delicate positional relationship between the printing area and sensor pattern S2 can be grasped.
2) The main control unit 51 has only to read information at intervals of eight scans and bears a lower load than in reading at intervals of a scan.

It is desirable that the number of scans for each input of the latched information (the period of the first counter) should be a multiple of the surfaces of a polygon mirror, taking into the accuracy of the surfaces of the polygon mirror. In the present embodiment, since the number of the surfaces of the polygon mirror is 8, the first counter is designed to output a carry signal at intervals of eight scans.

Next, the relationship between the light beam power and the printing area setting accuracy will be explained.

Figure 13:
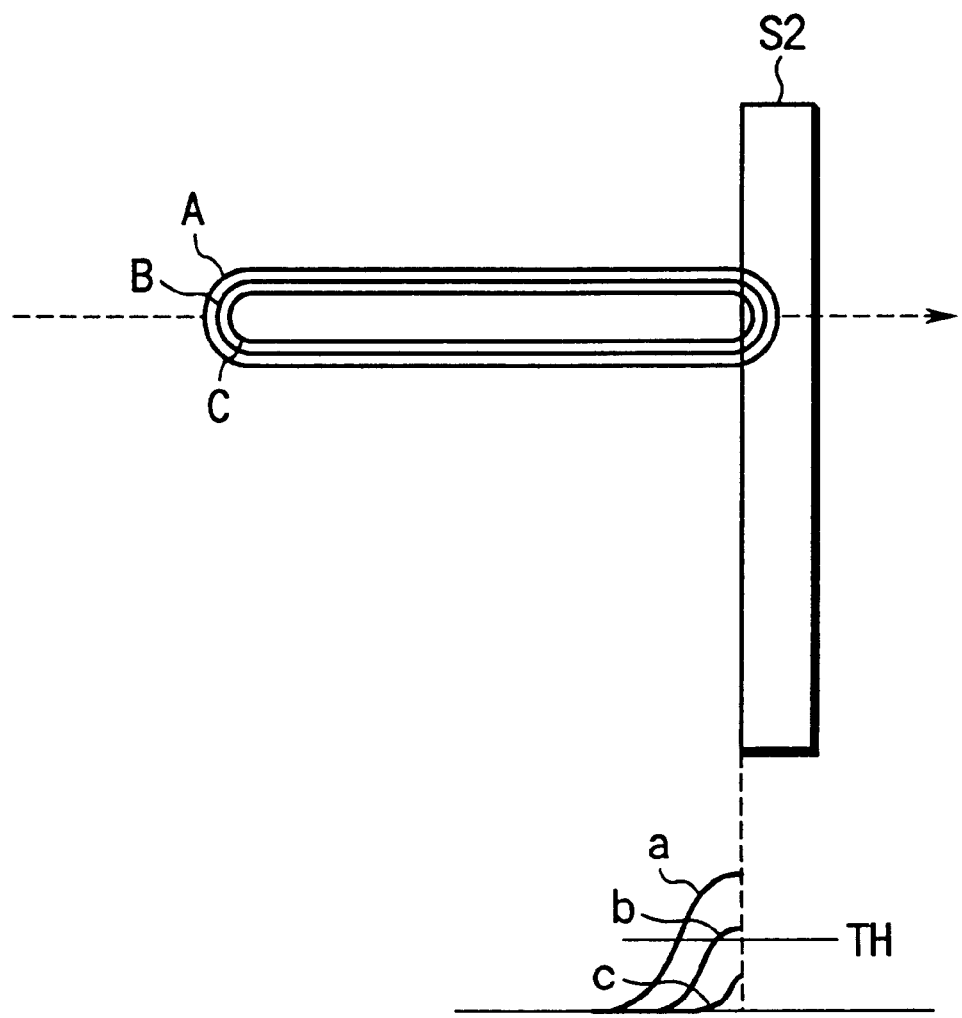
FIG. 13 schematically shows exposure areas when the light beam power differs.

FIG. 13 pictorially shows the exposure area in a case where the same delayed clock is selected, the number of clocks in the printing area is the same, and the light beam power is different. In FIG. 13, the light beam power is the highest at A and decreases in this order: B and C.

As shown in the figure, the higher the light beam power, the larger the area. As for the response of sensor pattern S2, it can be seen that the response of sensor pattern S2 differs even with the same printing area setting.

As shown in the figure, when the exposure edge of the light beam is in a position similar to that of the edge of sensor pattern S2, sensor pattern S2 makes a response or no response, depending on the light beam power. In the example of FIG. 13, when the light beam power is at A or B, the output a or b of sensor pattern S2 reaches a threshold level of TH. The second counter 112 then counts the output. When the light beam power is at C, the output c of sensor pattern S2 fails to reach the threshold level TH. As a result, the second counter 112 cannot count the output.

Therefore, to align the printing areas of light beams with each other with high accuracy, the power of each light beam must be made equal before the printing areas are controlled.

Next, the light-beam passing (scanning) position control will be explained in detail.

Figure 14:
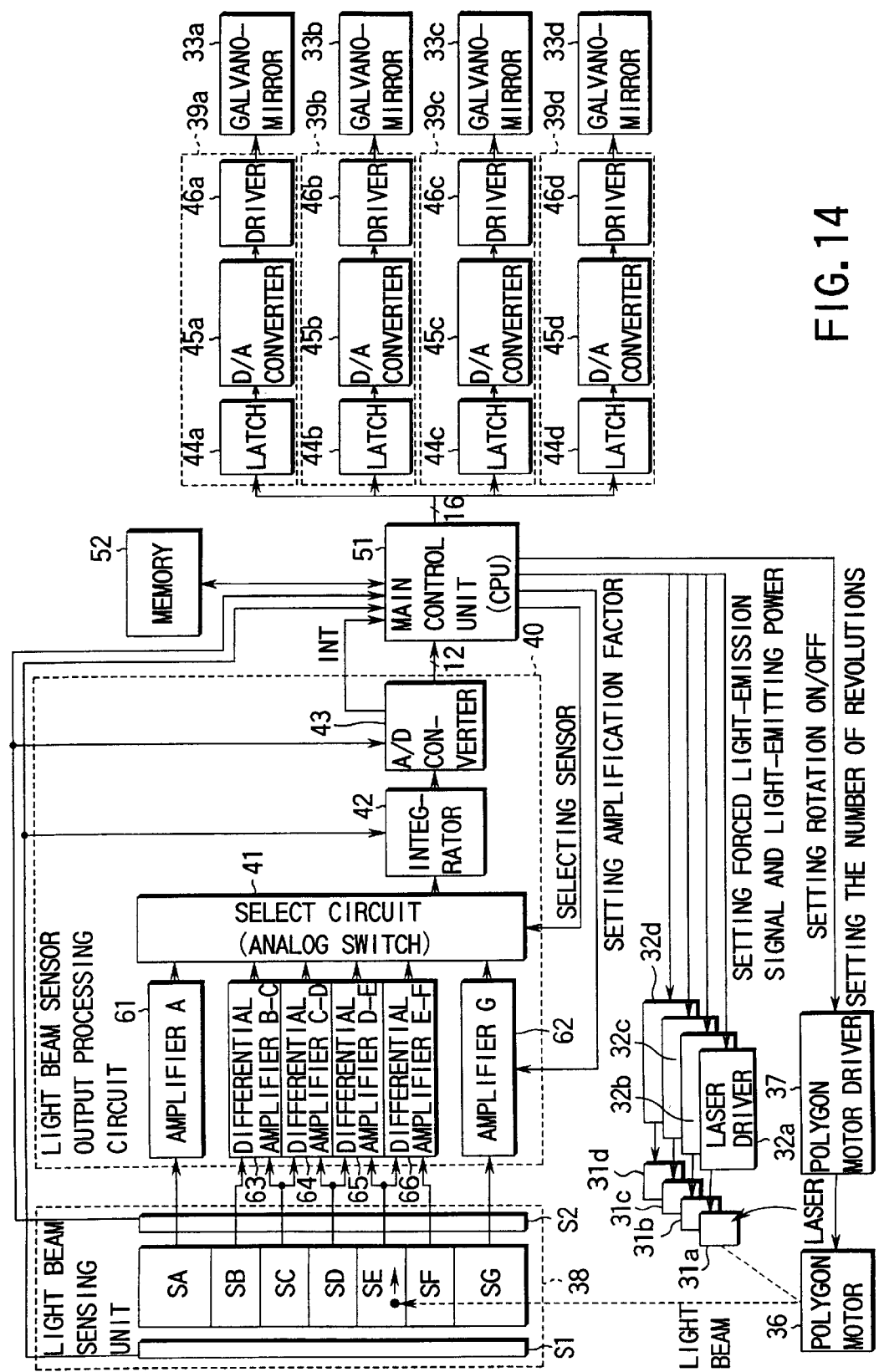
FIG. 14 is a block diagram to help explain passing position control of light beams and an offset sensing and correcting process.

FIG. 14 is a diagram to help explain the light-beam passing position control when the light beam sensing unit 38 of FIG. 3 is used. The portions related to the light-beam passing position control in the block diagram of FIG. 4 have been extracted and shown in detail.

As explained earlier, the sensor patterns S1, S2 of the light beam sensing unit 38 output pulse signals indicating that light beams have passed. The sensor patterns SA to SG output independent signals according to the passing positions of light beams.

The output signals of the sensor patterns SA, SG are inputted to amplifiers 61, 62 (hereinafter, sometimes referred to as amplifiers A, G), respectively. The amplification factor of each of the amplifiers 61, 62 is set by the main control unit 51 composed of a CPU.

As explained earlier, the galvanomirrors 33a to 33d are controlled so that the light beam may pass over sensor pattern AS or SG. Monitoring the output of sensor pattern SA or SG enables the relative light beam power on the photosensitive drum 15 to be sensed.

The output signals of the sensor patterns SB to SF are inputted to differential amplifiers 63 to 66 (hereinafter, sometimes referred to as differential amplifiers B–C, C–D, D–E, E–F) for amplifying the difference between the adjacent output signals from the sensor patterns SB to SF, respectively. The differential amplifier 63 amplifies the difference between the output signals from the sensor patterns SB, SC; the differential amplifier 64 amplifies the difference between the output signals from the sensor patterns SC, SD; the differential amplifier 65 amplifies the difference between the output signals from the sensor patterns SD, SE; and the differential amplifier 66 amplifies the difference between the output signals from the sensor patterns SE, SF.

The output signals from the amplifiers 61 to 66 are inputted to a select circuit (or an analog switch) 41. According to a sensor select signal from the main control unit (CPU) 51, the select circuit 41 selects a signal to be outputted to an integrator 42. The output signal of the amplifier selected by the select circuit 41 is integrated at the integrator 42.

The pulse signal from sensor pattern S1 is also inputted to the integrator 42. The pulse signal from sensor pattern S1 is used as a reset signal (or integration start signal) that resets the integrator 42 and simultaneously starts a new integrating operation. The functions of the integrator 42 is to remove noise and eliminate the effect of the inclination with which the light beam sensing unit 38 has been installed, which will be described in detail later.

The output of the integrator 42 is inputted to an A/D converter 43. The pulse signal from sensor pattern S2 is also inputted to the A/D converter 43. When receiving the signal from sensor pattern S2 as a conversion start signal, the A/D converter 43 starts analog-to-digital conversion. Namely, A/D conversion is started with the timing that a light beam passes over the sensor pattern S2.

As described above, immediately before the light beams pass over the sensor patterns SA to SG, the pulse signal from sensor pattern S1 resets the integrator 42 and at the same time, starts integration. As result, while the light beams are passing over the sensor patterns SA to SG, the integrator 42 integrates the signals indicating the passing positions of the light beams.

Then, immediately after the light beams have passed over the sensor patterns SA to SG, the pulse signal from sensor pattern 2 triggers the A/D converter 43 to A/D convert the result of integration at the integrator 42. This enables the sense signal with less noise from which the effect of the inclined installation of the light beam sensing unit 38 has been removed to be converted into a digital signal in light beam passing position sensing.

After the A/D conversion, the A/D converter 43 outputs an interrupt signal INT indicating the completion of the process to the main control unit 51.

The amplifiers 61 to 66, select circuit 41, integrator 42, and A/D converter 43 constitute the light beam sensor output processing circuit 40.

In this way, the light beam power sensing signal and light beam position sensing signal converted into digital signals are inputted to the main control unit 51 as relative light beam power information and light beam position information on the photosensitive drum 15. The main control unit 51 determines the power and passing position of each light beam on the photosensitive drum 15.

On the basis of the relative light beam power sensing signal and light beam position sensing signal on the photosensitive drum 15, the main control unit 51 sets the light-emitting power for each of the laser oscillators 31a to 31d and calculates the controlled variable for each of the galvanomirrors 33a to 33d. The results of calculation are stored in the memory 52, as the need arises. The main control unit 51 sends the results of calculation to the laser drivers 32a to 32d and the galvanomirror driving circuits 39a to 39d.

As shown in FIG. 6, the galvanomirror driving circuits 39a to 39d include latches 44a to 44d for storing the results of calculation, respectively. Once the main control unit 51 has written the data into the latches, the values remain unchanged until the data is updated.

The data items held in the latches 44a to 44d are converted by D/A converters 45a to 45d into analog signals (or voltages), which are then inputted to drivers 46a to 46d for driving the galvanomirrors 33a to 33d. The drivers 46a to 46d drive the galvanomirrors 33a to 33d according to the analog signals from the D/A converters 45a to 45d.

In the embodiment, because only one of the amplified output signal of the sensor patterns SA to SG is selected by the select circuit 41, integrated, and A/D converted, the output signals of the sensor patterns SA to SG cannot be inputted to the main control unit 51 at a time.

Therefore, to sense the power of the light beam, it is necessary to move the passing position of the light beam to over sensor pattern SA or SG and switch the select circuit 41 so that the output signal from the corresponding sensor pattern may be inputted to the main control unit 51.

When the passage of a light beam is unknown, it is necessary to determine the passing position of the light beam by switching the select circuit 41 sequentially and inputting the output signals from all the sensor patterns SA to SG to the main control unit 51 one after another.

Once where the light beam is passing has been determined, the position at which the light beam will pass can be estimated, so the output signals of all the sensor patterns do not always have to be inputted to the main control unit 51.

Figure 15:
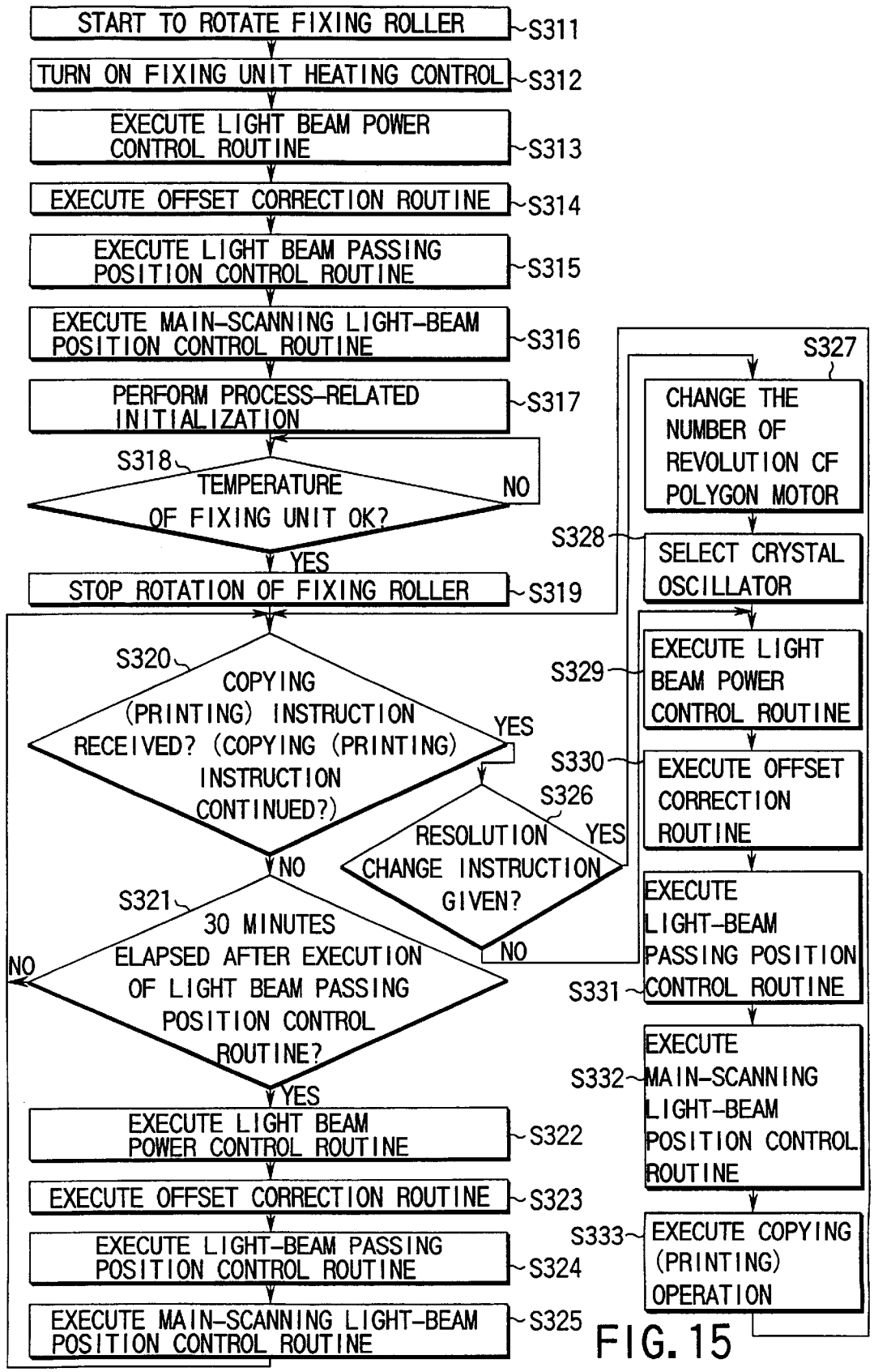
FIG 15 is a flowchart to help explain a general operation at the time of turning on the power supply of the printer section.
Figure 16:
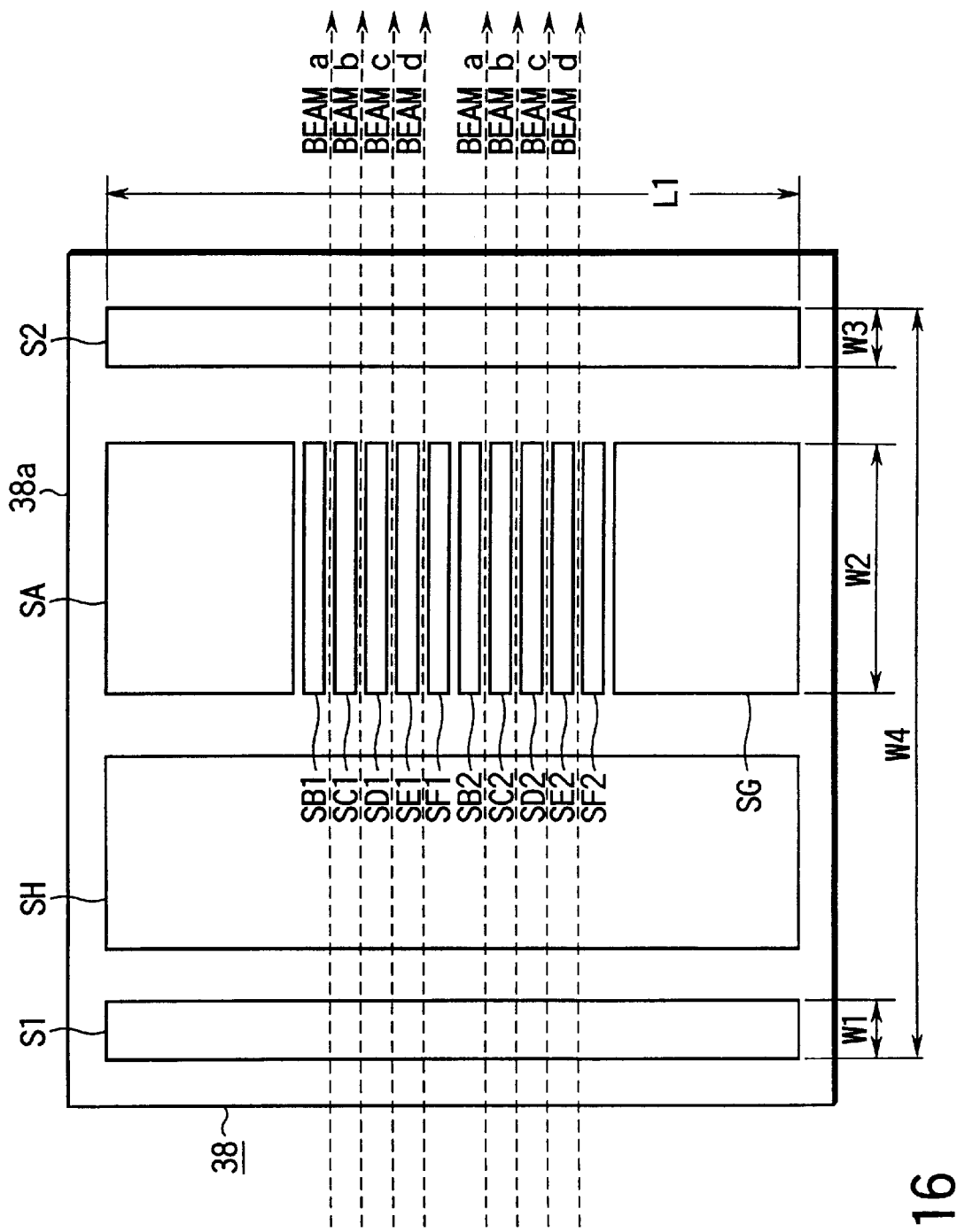
FIG. 16 schematically shows the configuration of the light beam sensing unit complying with two resolutions.

Next, the operation of the printer unit 2 at the time of the power supply being turned on will be described by reference to a flowchart shown in FIG. 15. Explanation of the operation of the scanner unit 1 will be omitted.

When the power supply for the copying machine is turned on, the main control unit 51 rotates the fixing rollers in the fixing unit 26 and starts heating control of the fixing unit 26 (S311, S312). Then, a light beam power control routine is executed, which controls the power of each light beam on the photosensitive drum 15 so that the power may be equal for the respective beams (S313).

After the power of each light beam on the photosensitive drum 15 has been controlled so as to have the same level, an offset correction routine is executed, which senses the offset value of the light beam sensor output processing circuit 40 and performs a correction process for the offset value (S314). Then, a light beam passing position control routine is executed (S315).

Next, a main-scanning light-beam position control routine is executed (S316). Then, the photosensitive drum 15 is rotated and process-related initialization, including the maintenance of the surface conditions for the photosensitive drum 15, is executed (S317).

After a series of such initialization actions, the fixing rollers are rotated until the temperature of the fixing unit 26 has risen to a specific temperature and the copying machine goes into the wait state (S318). When the temperature of the fixing unit 26 has risen to the specific temperature, the rotation of the fixing rollers is stopped (S319) and the copying machine goes into the copy instruction wait state (S320).

In the copy instruction wait state (S320), when no copying (or printing) instruction has been received from the control panel 53, if, for example, 30 minutes have elapsed since the preceding light beam passing position control routine was executed (S321), a light beam power control routine will be executed automatically (S322) and then an offset correction routine will be executed automatically (S323). Thereafter, the light beam passing position control routine and main-scanning light-beam position control routine will be executed again (S324, S325). After this, control will return to step S320, where the copying machine will go into the copy instruction wait state again.

In the copy instruction wait state (S320), when a copy instruction is received from the control panel 53, a check is made to see if there is an instruction to change the resolution (S326). As a result of the check, if there is an instruction to change the resolution, the number of revolutions of the polygon motor 36 is changed to a value suited for the specified resolution.

Then, a suitable one for the resolution is selected from the crystal oscillators 114a to 114d (S328). The light-beam power control routine is then executed (S329). Thereafter, the offset correction routine is executed (S330). Then, the light-beam passing position control routine is executed (S331). After this, the main-scanning light-beam position control routine is executed (S332) and the copy operation is performed (S333).

If the result of the check at step S326 has shown that there is no instruction to change the resolution, the light-beam power control routine will be executed (S329) because neither the number of revolutions of the polygon motor 36 nor the crystal oscillator will be changed. Then, the offset correction routine will be executed (S330). Thereafter, the light-beam passing position control routine (S331), the main-scanning light-beam position control routine (S332), and the copy operation (S333) will be executed in that order.

After the copy operation has been completed, control returns to step S320 and the copying machine repeats the above operations.

In this way, even in the intervals between one copy operation and another, the light-beam power control routine, light-beam passing position control routine, and main-scanning light-beam position control routine are executed. This enables an image to be formed in the best condition constantly even when a lot of copies are made consecutively.

Figure 17:
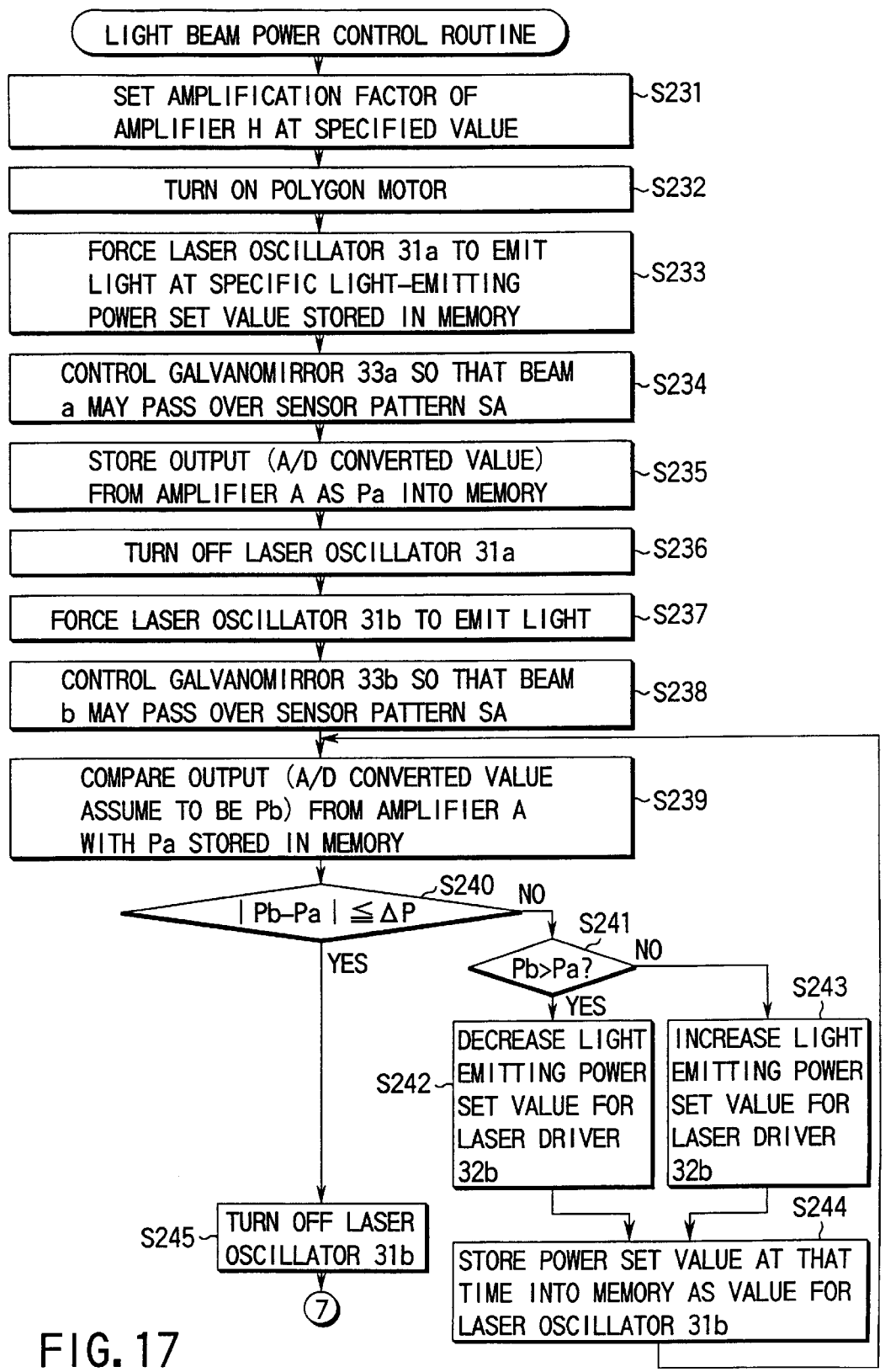
FIG. 17 is a flowchart to help explain a first example of a light-beam power control routine.
Figure 18:
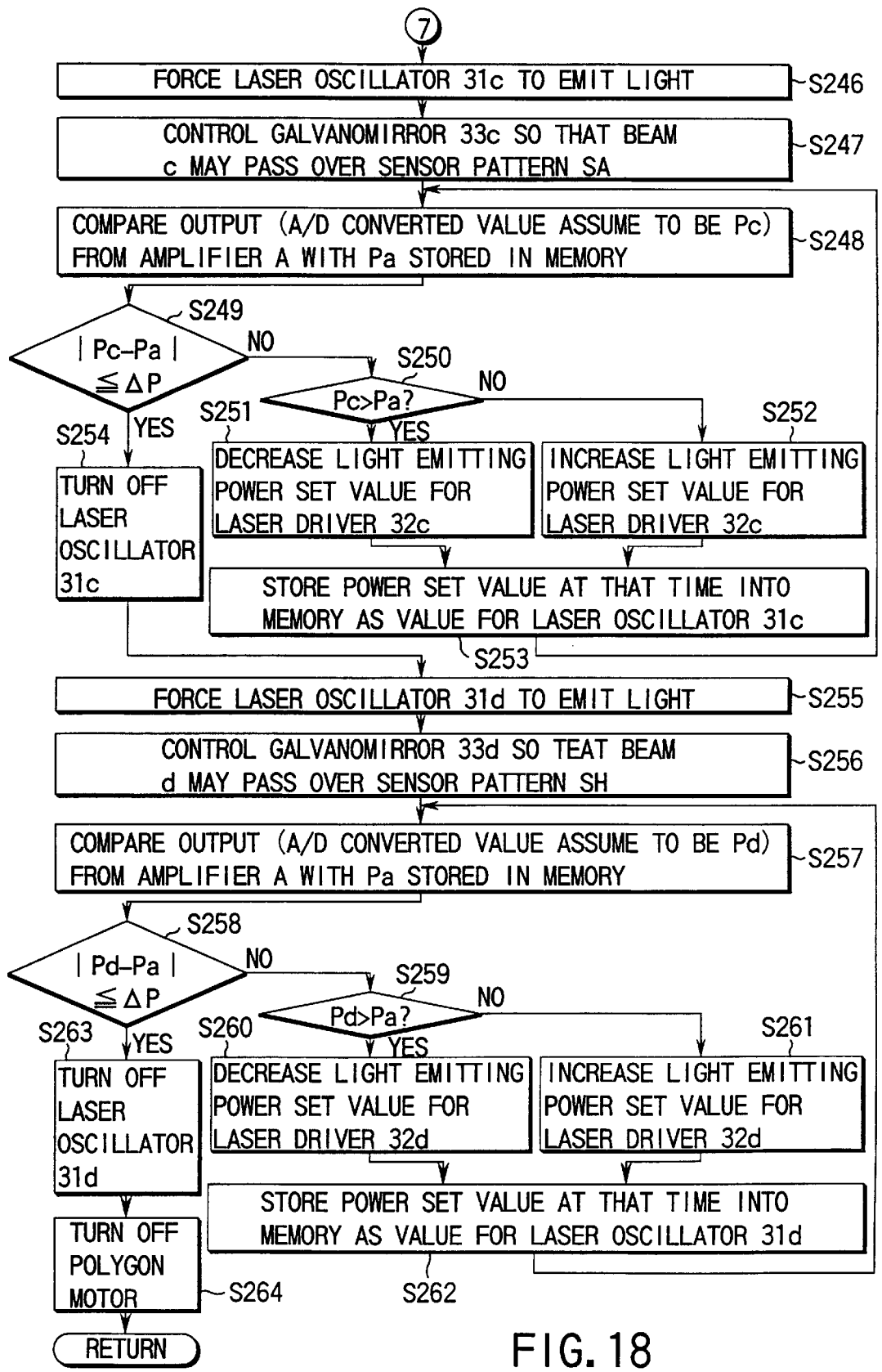
FIG. 18 is a flowchart to help explain the first example of the light-beam power control routine.

A first example of the light beam power control routine at steps S313, S322, and S329 in FIG. 15 will be described by reference to the flowcharts shown in FIGS. 17 and 18.

The main control unit 51 sets the amplification factor of the amplifier 61(A) at a specific value (S231). With each light beam passing over the sensor pattern SA, when the output of the amplifier 61(A) is integrated at the integrator 42 and A/D converted at the A/D converter 43, use of the specific value prevents the resulting value from being saturated and allows the value to change in proportion to the power of the light beam.

Next, the main control unit 51 turns on the polygon motor 36, thereby rotating the polygon mirror 35 at a specific number of revolutions (S232). Then, the main control unit 51 forces the laser oscillator 31a to emit light at a specific value stored in the memory 52 (S233). After this, the polygon mirror 35 causes the light beam a to start scanning. Here, the specific value is a value suitable for image formation at that time.

In general, in an image forming apparatus using electronic photographic processing, the power of the light beam must be changed, depending on the environment in which the image forming apparatus is installed or on its using conditions (including aging). The memory 52 stores data on the appropriate power of each light beam under such various conditions.

Then, the main control unit 51 controls the galvanomirror 33a so that the light beam a may pass over sensor pattern SA (S234). The light beam a has to pass through almost the center of sensor pattern SA so as not to stray from sensor pattern SA. If the beam a deviated from sensor pattern SA, the sensed power would have a smaller value.

Since the sensor pattern SA (or SG) used for light beam power control has a sufficient size (with a length of about 900 μm in the sub-scanning direction) as described in FIG. 3, it is impossible that such a problem will take place.

Then, when the light beam s starts to pass over the sensor pattern SA, the A/D converter 43 inputs a value proportional to the power of the beam a to the main control unit 51. The main control unit 51 stores the value (preferably, the average value of an integral multiple of the number of faces of the polygon mirror 35) into the memory 52 as the optical power Pa of the light beam a on the photosensitive drum 15 (S235) and turns off the laser oscillator 31a (S236).

Next, the main control unit 51 forces the laser oscillator 31b to emit light (S237) and controls the galvanomirror 33b as with the laser beam a, thereby causing the light beam b to pass over the sensor pattern SA (S238).

Then, the A/D converter 43 inputs a value proportional to the power of the beam b on the photosensitive drum 15 to the main control unit 51. The main control unit 51 determines the value to be the optical power Pb and compares it with the optical power Pa of the light beam a on the photosensitive drum 15 stored in the memory 52 (S239). In the case of the light beam b, too, it is desirable that the output value of the A/D converter 43 should be taken in as many times as an integral multiple of the number of faces of the polygon mirror 35 and the average of the output values be determined to be Pb.

As a result of comparing the optical power Pa of the beam a with the optical power Pb of the beam b on the photosensitive drum 15, if the difference is smaller than or equal to a specific value ($\Delta P$) (preferably, "0"), there will be no problem in terms of picture quality. If the difference is larger than the value, a picture quality problem will arise and correction be needed.

For example, as a result of comparing the optical power Pb with the optical power Pa, if Pb is larger than Pa and the difference between them is larger than $\Delta P$ (S240, S241), decreasing the light-emitting power set value for the laser driver 32b will enable the optical power of the light beam b on the photosensitive drum 15 to be decreased (S242).

Conversely, as a result of comparing the optical power Pb with the optical power Pa, if Pa is larger than Pb and the difference between them is larger than $\Delta P$ (S240, S241), increasing the light-emitting power set value for the laser driver 32b will enable the optical power of the light beam b on the photosensitive drum 15 to be increased (S243).

After having corrected the optical power of the beam b on the photosensitive drum 15, the main control unit 51 stores the light-emitting power set value at that time into the memory 52 as the value for the laser oscillator 31b (S244). Then, it returns control to step S239, senses the optical power of the beam b on the photosensitive drum 15 again, compares Pb with Pa, and repeats correction until the difference between them becomes equal to or smaller than $\Delta P$.

In this way, the difference between the power of the beam a and that of the beam b can be made equal to or smaller than the specific value ($\Delta P$).

The light beams c and d are processed in a similar manner at steps S245 to S264, thereby enabling the difference in optical power between the light beams a, b, c, and d on the photosensitive drum 15 to be equal to or smaller than the specific value ($\Delta P$).

While in the example, the light beam a has been used as a reference, the light beam b, c, or d may be used as a reference. It is desirable that the specific value ($\Delta P$) should be made 1% or less of the reference (the value of Pa).

The main-scanning light-beam position control routine at steps S316, S325, and S332 in FIG. 15 will be described by reference to the flowchart shown in FIG. 19.

The main control section 51 first acquires main-scanning light-beam position information on the light beam a (S341). Here, the main-scanning light-beam position information means that such set values in the image transfer clock generating sections (printing area setting sections) 119*a* to 119*d* and such selected information as makes pattern S2 of the light beam sensing unit 38 become the edge of the exposure area (printing area). A method of acquiring the information will be explained later in detail.

Similarly, main-scanning light-beam position information on light beam b, light beam c, and light beam d is also acquired (S342 to S344).

After having acquired main-scanning light-beam position information on the light beams a to d, the main control unit 51 sets the necessary printing area for actual image formation (copying or printing) (S345). The necessary printing area for actual image formation (copying or printing) is set according to main-scanning light-beam position information on the light beams a to d, the size of sheets used for image formation (copying or printing), and the filing margin.

For example, it is assumed that data items as shown in Table 1 have been acquired as main-scanning light-beam position information on the light beams a to d.

TABLE 1

|        | PRINTING AREA<br>START & END | DELAYED<br>CLOCK |
|--------|------------------------------|------------------|
| BEAM a | 5 to 9                       | D5               |
| BEAM b | 12 to 16                     | D8               |
| BEAM c | 18 to 22                     | D2               |
| BEAM d | 20 to 24                     | D7               |

If the size of sheets used for actual image formation is, for example, A4 lateral with no settings, including a filing margin, the printing area will contain 7015 (≈297× 600÷25.4) pixels with a resolution of 600 dpi.

Here, it is assumed that the distance between sensor pattern S2 of the light beam sensing unit 38 and the left end of the actual printing area is equivalent to 100 pixels. In this case, the pixel clock area for each light beam corresponding to the printing area (or target image formation area) is set as shown in Table 2.

TABLE 2

|        | PRINTING AREA<br>START & END | DELAYED<br>CLOCK |
|--------|------------------------------|------------------|
| BEAM a | 109 to 7124                  | D5               |
| BEAM b | 116 to 7131                  | D8               |
| BEAM c | 122 to 7137                  | D2               |
| BEAM d | 124 to 7139                  | D7               |

After the stetting has been done, when delayed clock D5 is selected for light beam a, D8 is selected for light beam b, D2 is selected for light beam c, and D7 is selected for light beam d, the printing areas of the light beams a to d coincide with each other with an accuracy of one-tenth of a pixel.

Figure 19:
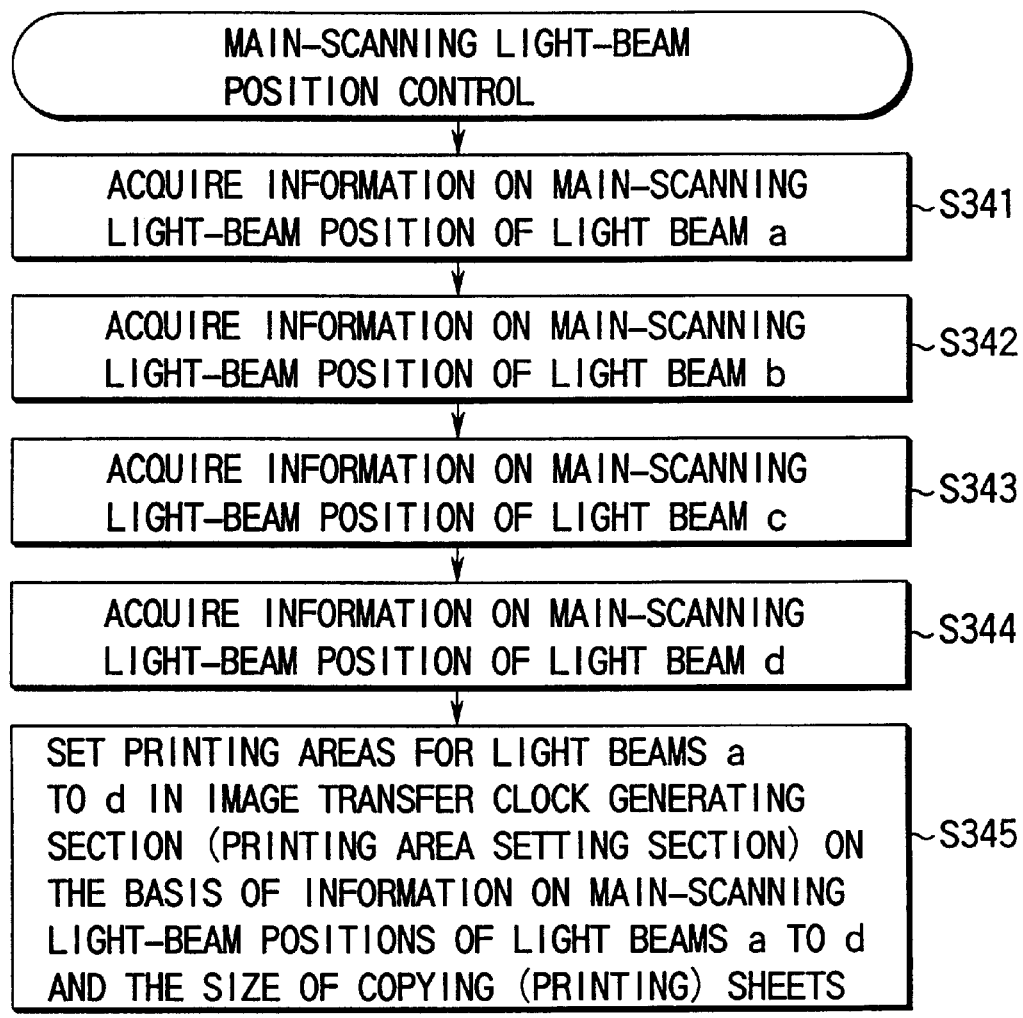
FIG. 19 is a flowchart to help explain the main-scanning light-beam position control routine.
Figure 20:
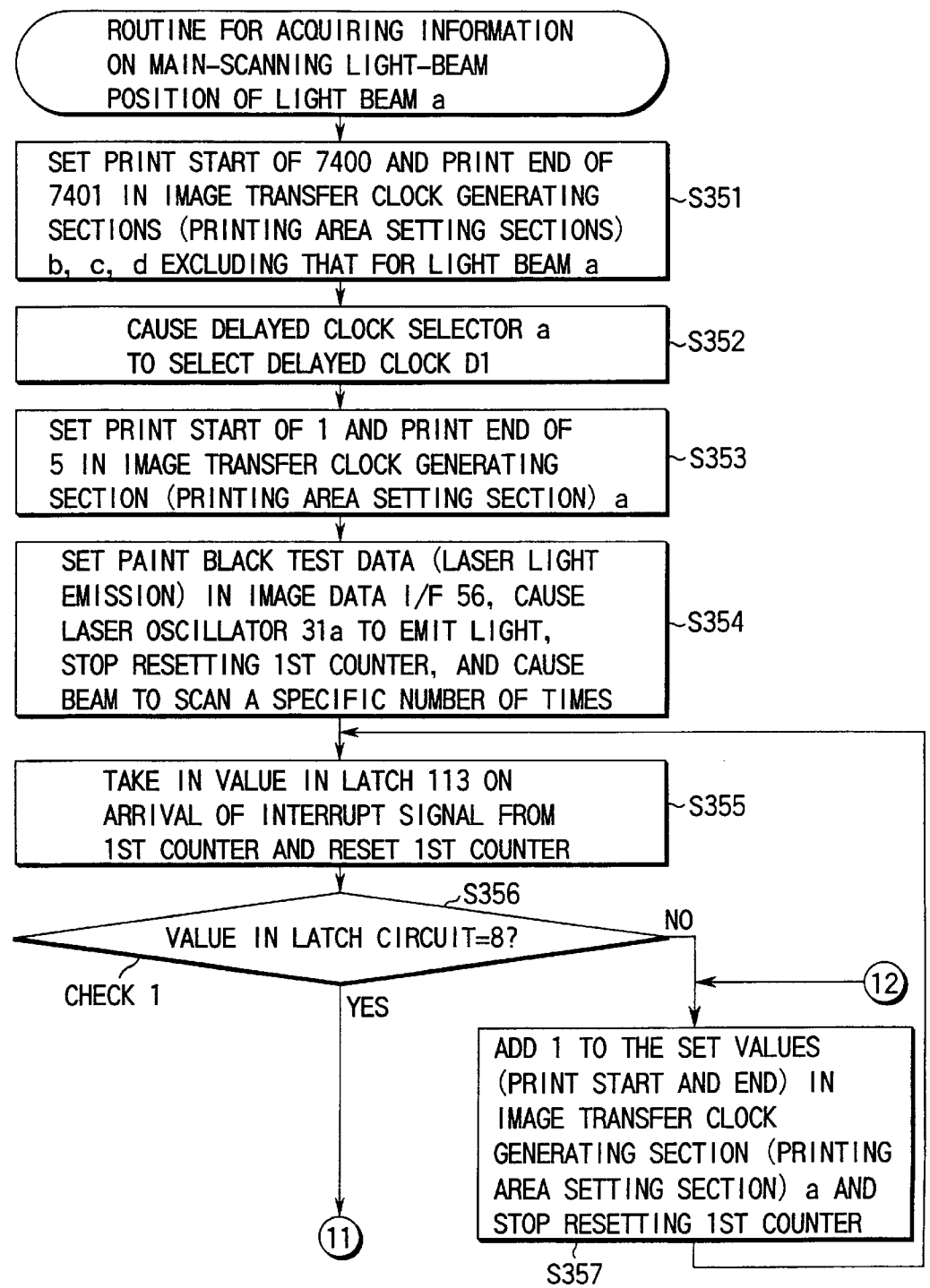
FIG. 20 is a flowchart to help explain the routine for acquiring information on the main-scanning light-beam position of a light beam.
Figure 21:
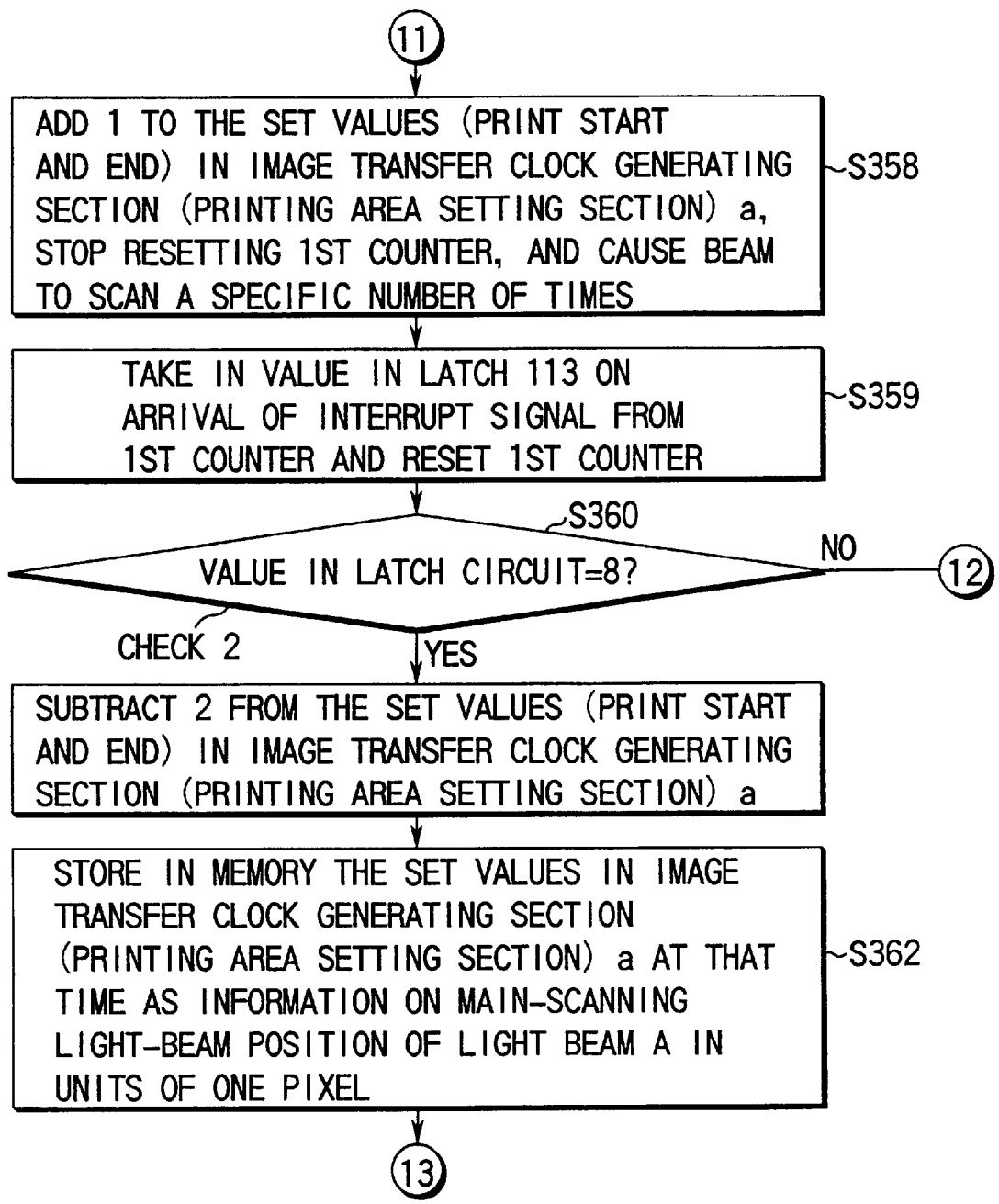
FIG. 21 is a flowchart to help explain the routine for acquiring information on the main-scanning light-beam position of the light beam.
Figure 22:
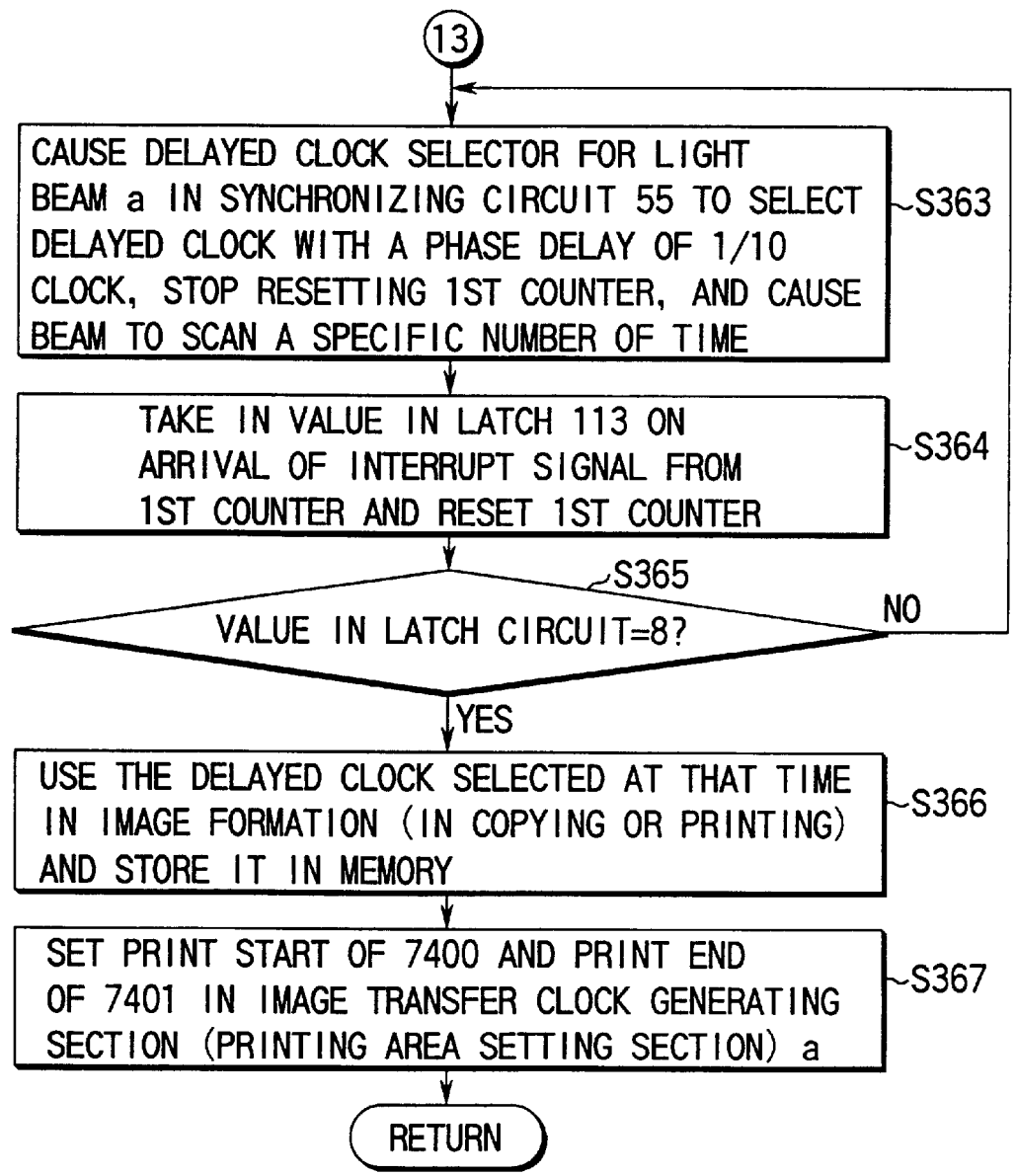
FIG. 22 is a flowchart to help explain the routine for acquiring information on the main-scanning light-beam position of the light beam.

FIGS. 20, 21, and 22 are flowcharts to help explain routines for acquiring main-scanning light-beam information on light beam a at step S341 in FIG. 19. Explanation of the beam a applies to the beams b to d.

In preparation for acquiring information on light beam a, the main control unit 51 sets, for example, the print start of 7400 and the print end of 7401 in the image transfer clock generating sections (printing area setting sections) 119*b* to 119*d* (S351). In step S351, the printing (exposure) areas other than that of light beam a are moved further away from the light beam sensing unit 38 and the photosensitive drum 15 is also moved to a place where it will not be exposed. Step 351 is the necessary step to prevent the light beams a to d from interfering with each other. Step S351 makes it possible to acquire accurate information only on light beam a.

Next, the main control unit 51 sets the delayed clock selector 118*a* so that delayed clock D1 may be used for image formation (S352). Then, the main control unit 51 sets a print start position of 1 and a print end position of 5 in the image transfer clock generating section (printing area setting section) 119*a* (S353).

Thereafter, the main control section 51 sets paint black test data in the image data I/F 56, causes the laser oscillator 31*a* to emit light according to the paint black test data, stops resetting the first counter 111, and causes the beam to scan the scanning surface a specific number of times, or eight times, according to the number of the surfaces of the polygon mirror (S354). As explained earlier, the operation causes the printing area 1–5 (an area equivalent to five dots) to be exposed with sensor pattern S1 of the light beam sensing unit 38 as a reference.

Then, the main control unit 51 takes in the data held in the latch circuit 113 in response to the interrupt signal (carry) from the first counter 111, resets the first counter (S355), and judges whether the value is 8 (check 1: S356).

When the result of the judgment has shown that the taken-in data is not 8, this means that sensor pattern S2 of the light beam sensing unit 38 has not been exposed sufficiently. Therefore, after adding a value of 1 to each of the set values (print start and end) in the image transfer clock generating section (printing area setting section) 119*a* and shifting the printing area (exposure area) one pixel, the main control unit 51 stops resetting the first counter 111 (S357), and waits for the interrupt signal from the first counter 111.

When the result of the judgment at step S356 has shown that the taken-in data is 8, this means that sensor pattern S2 of the light beam sensing unit 38 has been exposed sufficiently. In this case, after further adding a value of 1 to each of the set values (print start and end) in the image transfer clock generating section (printing area setting section) 119*a* and shifting the printing area (exposure area) one pixel, the main control unit 51 stops resetting the first counter 111 and causes the beam to scan the scanning surface a specific number of times or eight times (S358).

Next, the main control unit 51 takes in the data held in the latch circuit 113 in response to the interrupt signal (carry) from the first counter 111 (S359) and judges whether the value is 8 (check 2: S360).

When the result of the judgment has shown that the taken-in data is not 8, the main control unit 51 adds a value of 1 to each of the set values (print start and end) in the image transfer clock generating section (printing area setting section) 119*a* as in the preceding process, shifts the printing area (exposure area) one pixel, stops resetting the first counter 111 (S357), and makes the first check (check 1) again.

When the result of the judgment at step S360 has shown that the taken-in data is 8, the values obtained by subtracting 2 from the set values (print start and end) in the image transfer clock generating section (printing area setting section) 119*a* are set in the image transfer clock generating section (printing area setting section) 119*a* (S361). The values at this time are stored in the memory 52 as main-scanning light-beam position information on light beam a in units of one pixel (S362).

By those operations, the main control section 51 can shift the 5-pixel printing area (exposure area) one pixel by one pixel, recognize how many pixels it has to shift the printing area before the printing area reaches sensor pattern S2 of the light beam sensing unit 38, and stores the value immediately before the arrival at sensor pattern S2 into the memory 52.

In the embodiment, although the printing area (exposure area) has reached sensor pattern S2 of the light beam sensing unit 38 (although the check 1 has been made), it is verified that the printing area (exposure area) has been further shifted one pixel and sensor pattern S2 has been exposed (or that the check 2 has been made). The reason is that even when the sensor pattern S2 of the light beam sensing unit 38 has responded to unnecessary stray light that might develop in the optical system unit, the main control unit 51 has to distinguish from the correct response from the unwanted response.

Generally, the energy of stray light is much lower than that of the main light beam and sensor pattern S2 of the light beam sensing unit 38 will hardly respond to such stray light. For some reason, however, sensor pattern S2 could respond. To avoid such erroneous responses, it is necessary to make sure that sensor pattern S2 responses reliably (or senses light reliably) even when the printing area (exposure area) has been shifted extra several pixels since sensor pattern S2 began to response.

In the embodiment, to simplify explanation, the printing area (exposure area) has been made up of five pixels and the amount of shift to make the above checks has been determined to be one pixel. The present invention is not restricted to these values. The size of the printing area (exposure area) and the number of checks may be determined suitably, taking into account the size of sensor pattern S2 of the light beam sensing unit 38.

After main-scanning light-beam position information on light beam a has been acquired in units of one pixel, the main control unit 51 carries out the operation of acquiring main-scanning light-beam position information in units of one-tenth of a pixel.

With delayed clock D1 being selected, the printing area (exposure area) has been set in units of one pixel and is in a position immediately before sensor pattern S2 of the light-beam sensing unit 38 starts to respond. In this state, the main control unit 51 switches the delayed clock from D1 to D2 (or shifts the position of the clock one-tenth of a clock), stops resetting the first counter 111, causes the beam to scan the scanning surface eight times, and waits for an interrupt signal (S363).

Receiving the interrupt signal from the first counter 111, the main control unit 51 takes in the value from the latch circuit 113 of the main-scanning beam position sensing circuit in the light-beam position sensing output circuit 40 and resets the first counter 111 (S364).

Next, the main control unit 51 judges whether the value in the latch circuit 113 is 8 (S365) and checks whether the printing area (exposure area) has reached sensor pattern S2 of the light-beam sensing unit 38.

When the result of the check has shown that the latched value is not 8, this means that the printing area (exposure area) has not reached sensor pattern S2 yet. The main control unit 51 returns control to step S363, selects a 1/10-clock-shifted delayed clock, and makes judgments as described above.

When the result of the check at step S365 has shown that the latched value is 8, this means that the printing area (exposure area) has reached sensor pattern S2. Namely, because the printing area has reached the target area, the main control unit 51 uses the delayed clock in image formation (e.g., copying or printing) and stores the selected delayed clock in the memory 52 (S366).

As described above, the main control unit 51 can move the printing area (exposure area) in units of about one-tenth of a pixel on the basis of the setting of the printing area (exposure area) and the selection of the delayed clock. Checking the response from sensor pattern S2 of the light beam sensing unit 38 at that time, the main control unit 51 acquires main-scanning light-beam position information on light beam a with an accuracy of about one-tenth of a pixel.

In the embodiment, the printing area (exposure area) has been shifted one by one to the downstream side in the direction of light beam scanning to find a point at which sensor pattern S2 of the light beam sensing unit 38 responds. The present invention is not limited to this.

For instance, the printing area (exposure area) may be further shifted one by one to the downstream side in the direction of light beam scanning to find a point at which sensor pattern S2 of the light beam sensing unit 38 makes no response. Then, the point may be used as main-scanning light-beam position information on each of the light beams a to d.

Furthermore, the printing area (exposure area) may have been set on the downstream side in the direction of light beam scanning and be shifted one by one to the upstream side to find a point where sensor pattern S2 of the light beam sensing unit 38 makes a response or no response.

As explained in detail, according to the present invention, there are provided a light beam scanning apparatus and an image forming apparatus which enable the relative exposure position to be always controlled accurately even when the relationship between the main scanning positions of light beams is unknown.

Furthermore, according to the present invention, there is provided a beam scanning apparatus applicable to an image forming apparatus with more than one resolution.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:

a plurality of beam generating means for generating light beams;

scanning means for optically combining the light beams generated at said beam generating means, reflecting the combined beams to a scanning surface including the surface of an image retaining element, and causing said light beams to scan said scanning surface;

first sensing means, provided near said image retaining element, for sensing the first one of said light beams caused by said scanning means to scan;

clock generating means for generating a pixel clock to be used in said beam generating means for each of said light beams, in response to a sense signal indicating that said first beam has exposed said first sensing means;

second sensing means, provided on the more downstream side in the main scanning direction than said first sensing means, for sensing said light beams;

first control means for giving control data to said clock generating means so that said light beams may expose a target area between said first and second sensing means; and image formation area setting means for determining a pixel clock area corresponding to a target image formation area on said image retaining element on the basis of the control data from said control means and setting the pixel clock area in said clock generating means, wherein said clock generating means includes clock means for generating a clock signal a specific time after said first beam exposed said first sensing means;

delay means for delaying said clock signal generated at said clock means, selecting the delay of said clock in a range of one clock or less for each beam, and providing a delayed clock signal as a pixel clock to be used to generate a beam; and clock setting means for setting, for the respective beams, exposure pixel clock areas used by said beam generating means in the pixel clocks given by said delay means and providing exposure pixel clocks, wherein said delay means includes a delay line and delay clock selectors, said delay line having taps, and each of said delay clock selectors designed to select and output a delayed clock generated at one tap, which is to be used to generate one beam, wherein the target area between said first and second sensing means is an area overlapping with said second sensing means, said light beam scanning apparatus further comprising a counter for counting the number of times said beams expose said second sensing means;

second control means for driving one of said beam generating means using the exposure pixel clock obtained from said clock setting means controlled on the basis of said control data and causing said scanning means to scan said scanning surface a specific number of times;

comparison means for reading a value in said counter after said second control means has scanned the specific number of times and comparing the value with a predetermined number;

means for selecting the next tap whose amount of delay is greater than that of said selected tap when the result of the comparison at said comparison means has shown that the value in said counter is smaller than said predetermined number; and amount-of-delay setting means, when the result of the comparison at said comparison means has shown that the value in said counter is equal to said predetermined number, for setting a delay selected at that time as the amount of delay for the one of said beam generating means.

2. A light beam scanning apparatus according to claim 1, wherein the operations carried out by said first control means and said image formation area setting means are executed immediately after the power supply of said light beam scanning apparatus has been tuned on.

3. A light beam scanning apparatus according to claim 1, wherein the operations carried out by said first control means and said image formation area setting means are executed at specific intervals of time.

4. A light beam scanning apparatus according to claim 1, further comprising drum exposure inhibit means for controlling said beam generating means in such a manner that said light beams caused by said scanning means to scan are prevented from exposing said image retaining element, wherein the operations carried out by said first control means and said image formation area setting means are executed after an operation of said drum exposure inhibit means has been started.

5. A light beam scanning apparatus according to claim 1, further comprising resolution setting means for setting image resolution at which an image is retained on said image retaining element;

scanning speed changing means for changing the scanning speed of said scanning means according to the resolution set by said resolution setting means; and clock changing means for changing the frequency of a clock generated by said clock generating means according to the resolution set by said resolution setting means.

6. A light beam scanning apparatus according to claim 1, further comprising light beam power sensing means for sensing the power of each of said light beams caused by said scanning means to scan said scanning surface; and light beam power control means for controlling said light beam generating means on the basis of the result of sensing at said light beam power sensing means in such a manner that the power of each of said light beams lies in a specific range.

7. An image forming apparatus comprising:

image reading means for optically reading the image of a document and providing image data corresponding to the image of the document;

a plurality of beam generating means for generating light beams corresponding to said image data provided by said reading means;

scanning means for optically combining the light beams generated at said beam generating means, reflecting the combined beams to a scanning surface including the surface of a photosensitive drum and causing said light beams to scan said scanning surface;

first sensing means, provided near said photosensitive drum, for sensing the first one of said light beams caused by said scanning means to scan;

clock generating means for generating a pixel clock to be used in said beam generating means for each of said light beams, in response to a sense signal indicating that said first beam has exposed said first sensing means;

second sensing means, provided on the more downstream side in the main scanning direction than said first sensing means, for sensing said light beams;

first control means for giving control data to said clock generating means so that said light beams may expose a target area between said first and second sensing means;

setting means for determining a pixel clock area corresponding to a target image formation area on said photosensitive drum on the basis of the control data for said control means and setting the pixel clock area in said clock generating means;

image formation means for forming, by means of said beam generating means, an electrostatic latent image corresponding to the image data provided by said reading means in an image formation area on said photosensitive drum corresponding to said pixel clock area set by said setting means; and printing means for printing on a sheet of paper a visible image corresponding to the electrostatic latent image formed on said photosensitive drum, wherein said clock generating means includes clock means for generating a clock signal a specific time after said first beam exposed said first sensing means;

delay means which delays said clock signal generated at said clock means, selects the delay of said clock in a range of one clock or less for each beam, and provides a delayed clock signal as a pixel clock to be used to generate a beam; and clock selecting means for selecting, for the respective beams, exposure pixel clock areas used by said beam generating means in the pixel clocks given by said delay means and providing exposure pixel clocks, wherein said delay means includes a delay line and delay clock selectors, said delay line having taps, and each of said delay clock selectors designed to select and output a delayed clock generated at one tap, which is to be used to generate one beam, and said clock selecting means includes a plurality of pixel clock setting means for setting the exposure pixel clock area corresponding to said target area in the pixel clocks provided from said delayed clock selector for each of the beams on the basis of said control data, wherein the target area between said first and second sensing means is an area overlapping with said second sensing means, said light beam scanning apparatus further comprising a counter for counting the number of times said beams expose said second sensing means;

second control means for driving one of said beam generating means using the exposure pixel clock obtained from said clock setting means controlled on the basis of said control data and causing said scanning means to scan said scanning surface a specific number of times;

comparison means for reading a value in said counter after said second control means has scanned the specific number of times and comparing the value with a predetermined number;

means for selecting the next tap whose amount of delay is greater than that of said selected tap when the result of the comparison at said comparison means has shown that the value in said counter is smaller than said predetermined number; and amount-of-delay setting means, when the result of the comparison at said comparison means has shown that the value in said counter is equal to said predetermined number, for setting a delay selected at that time as the amount of delay for the one of said beam generating means.

8. An image forming apparatus according to claim 7, further comprising:

resolution setting means for setting image resolution at which an image is formed on said photosensitive drum;

scanning speed changing means for changing the scanning speed of said scanning means according to the resolution set by said resolution setting means; and clock changing means for changing the frequency of a clock generated by said clock generating means according to the resolution set by said resolution setting means.

9. A light beam scanning method comprising:

the step of causing light beams generated by light beam generators to scan a scanning surface including the surface of a photosensitive drum;

the step of causing a first sensor provided near said photosensitive drum to sense the first one of said light beams;

the step of causing a second sensor provided on the more downstream side in the main scanning direction than said first sensor to sense said light beams;

the step of giving control data to a pixel transfer clock generator so that said light beams may expose a target area between said first and second sensors and thereby generating an exposure pixel clock for each of the light beams; and the step of determining a pixel clock area corresponding to an image formation area on said photosensitive drum on the basis of said control data and setting the pixel clock area in said clock generator, wherein said clock generating step includes the step of generating a clock after a specific time period lapses from time at which said first beam exposed said first sensor;

a step which delays said generated clock, selects the delay of said clock in a range of one clock or less for each beam, and provides a delayed clock as said pixel clock for each beam; and the step of selecting an exposure clock area corresponding to said target area in said pixel clocks and providing an exposure pixel clock for each of said beams, wherein said delaying step includes a delay selecting step of selecting, for each of said beams, a delayed clock generated at one of the taps of a delay line for delaying said clock on the basis of said control data and outputting the selected clock as said pixel clock, and said exposure pixel clock area selecting step includes the step of setting the exposure pixel clock area corresponding to said target area in the pixel clocks provided in said delay selecting step for each of the beams on the basis of said control data, wherein the target area between said first and second sensors is an area overlapping with said second sensor, said light beam scanning method further comprising the step of driving one of said beam generators using said exposure pixel clock generated on the basis of said control data and scanning said scanning surface a specific number of times;

the step of counting the number of times said beams expose said second sensor;

the step of reading the counted number of exposures after scanning has been done said specific number of times and comparing its value with a predetermined number;

the step of selecting the next tap whose amount of delay is greater than that of said selected tap when the result of said comparison has shown that said number of exposures is smaller than said predetermined number; and the step of setting, when the result of said comparison has shown that said number of exposures is equal to said predetermined number, the tap selected at that time as the amount of delay for the one of said beam generators.

* * * * *